(12) United States Patent
Oberman et al.

(10) Patent No.: US 8,106,914 B2
(45) Date of Patent: Jan. 31, 2012

(54) FUSED MULTIPLY-ADD FUNCTIONAL UNIT

(75) Inventors: Stuart Oberman, Sunnyvale, CA (US);
Ming Y. Siu, Santa Clara, CA (US);
David C. Tannenbaum, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 915 days.

(21) Appl. No.: 11/952,858

(22) Filed: Dec. 7, 2007

(65) Prior Publication Data
US 2009/0150654 A1 Jun. 11, 2009

(51) Int. Cl.
*G06T 1/20* (2006.01)
*G06T 1/00* (2006.01)
*G06T 15/00* (2011.01)
*G06F 15/16* (2006.01)
*G06F 7/38* (2006.01)

(52) U.S. Cl. ......... 345/506; 345/503; 345/522; 708/490

(58) Field of Classification Search .......... 345/503, 345/506, 522; 708/490, 495
See application file for complete search history.

(56) References Cited

U.S. PATENT DOCUMENTS

| | | | |
|---|---|---|---|
| 4,771,379 A | | 9/1988 | Ando et al. |
| 4,893,268 A | | 1/1990 | Denman et al. |
| 4,969,118 A | | 11/1990 | Montoye et al. |
| 4,972,362 A | * | 11/1990 | Elkind et al. ............ 708/632 |
| 5,068,816 A | | 11/1991 | Noetzel |
| 5,241,636 A | | 8/1993 | Kohn |
| 5,450,556 A | * | 9/1995 | Slavenburg et al. ......... 712/235 |
| 5,452,241 A | | 9/1995 | Desrosiers et al. |
| 5,487,022 A | * | 1/1996 | Simpson et al. ............ 708/205 |
| 5,517,438 A | * | 5/1996 | Dao-Trong et al. ......... 708/501 |
| 5,524,090 A | | 6/1996 | Iwamura |
| 5,524,244 A | * | 6/1996 | Robinson et al. ............ 717/140 |
| 5,548,545 A | * | 8/1996 | Brashears et al. ............ 708/495 |
| 5,561,810 A | | 10/1996 | Ohtomo |

(Continued)

FOREIGN PATENT DOCUMENTS

DE    11 2006 003 473 T5    10/2008

(Continued)

OTHER PUBLICATIONS

Kurzak, Jakub et al.; "Implementation of the Mixed-Precision High Performance LINPACK Benchmark on the CELL Processor"; 2006, *Technical Report No. UT-CS-06-580, Department of Computer Science, University of Tennessee*, 12 pages.

(Continued)

*Primary Examiner* — David T Welch
(74) *Attorney, Agent, or Firm* — Kilpatrick Townsend & Stockton LLP

(57) ABSTRACT

A functional unit is added to a graphics processor to provide direct support for double-precision arithmetic, in addition to the single-precision functional units used for rendering. The double-precision functional unit can execute a number of different operations, including fused multiply-add, on double-precision inputs using data paths and/or logic circuits that are at least double-precision width. The double-precision and single-precision functional units can be controlled by a shared instruction issue circuit, and the number of copies of the double-precision functional unit included in a core can be less than the number of copies of the single-precision functional units, thereby reducing the effect of adding support for double-precision on chip area.

17 Claims, 11 Drawing Sheets

U.S. PATENT DOCUMENTS

| | | | |
|---|---|---|---|
| 5,581,778 A * | 12/1996 | Chin et al. | 712/16 |
| 5,673,407 A * | 9/1997 | Poland et al. | 712/222 |
| 5,701,405 A | 12/1997 | Kelley et al. | |
| 5,734,874 A | 3/1998 | Van Hook et al. | |
| 6,061,781 A * | 5/2000 | Jain et al. | 712/221 |
| 6,198,488 B1 * | 3/2001 | Lindholm et al. | 345/426 |
| 6,243,732 B1 | 6/2001 | Arakawa et al. | |
| 6,317,133 B1 | 11/2001 | Root et al. | |
| 6,363,476 B1 | 3/2002 | Ide | |
| 6,480,872 B1 | 11/2002 | Choquette | |
| 6,490,607 B1 | 12/2002 | Oberman | |
| 6,557,022 B1 | 4/2003 | Sih et al. | |
| 6,873,324 B2 * | 3/2005 | Saito et al. | 345/419 |
| 6,895,423 B2 | 5/2005 | Kawata | |
| 6,912,557 B1 | 6/2005 | North et al. | |
| 6,976,043 B2 | 12/2005 | Clifton | |
| 7,437,538 B1 * | 10/2008 | Brooks et al. | 712/214 |
| 7,484,076 B1 * | 1/2009 | Oberman et al. | 712/203 |
| 7,617,384 B1 * | 11/2009 | Coon et al. | 712/220 |
| 7,640,285 B1 | 12/2009 | Oberman et al. | |
| 7,747,842 B1 * | 6/2010 | Goudy et al. | 712/220 |
| 2004/0085321 A1 * | 5/2004 | Oka et al. | 345/501 |
| 2005/0235134 A1 * | 10/2005 | O'Sullivan | 712/10 |
| 2005/0273769 A1 * | 12/2005 | Eichenberger et al. | 717/136 |
| 2006/0098021 A1 * | 5/2006 | Rim et al. | 345/543 |
| 2009/0049276 A1 * | 2/2009 | Bergland et al. | 712/24 |

FOREIGN PATENT DOCUMENTS

| | | |
|---|---|---|
| GB | 2455401 B | 5/2010 |
| JP | 7-281872 A2 | 10/1995 |
| JP | 8-87400 A | 4/1996 |
| JP | 2008-302713 A | 12/2008 |
| KR | 10-1009095 | 12/2008 |

OTHER PUBLICATIONS

Piñeiro et al., "Faithful Powering Computation Using Table Look-up and a Fused Accumulation Tree" Proceedings of the 15th IEEE Symposium on Computer Arithmetic (ARITH'01), (2001).

Muller, "Partially rounded" Small-Order Approximations for Accurate, Hardware-Oriented, Table-Based Methods Proceedings of the 16th IEEE Symposium on Computer Arithmetic (ARITH'03), (2003).

Tannenbaum, "Structured Computer Organization," Prentice-Hall, 1984, p. 11.

Jain, et al., "Rapid System Prototyping for High Performance Reconfigurable Computing," Design Automation for Embedded Systems, Kluwer Academic Publishers, Boston, vol. 5, pp. 339-350.

Jain, et al., "Hardware Implementation, of a Nonlinear Processor," Proceedings of the 1999 IEEE International Symposium on Circuits and Systems, May 30-Jun. 2, 1999, vol. 6, pp. 509-514.

Ligon, et al., "Implementation and Analysis of Numerical Components for Reconfigurable Computing," Proceedings of the 1999 IEEE Aerospace Conference, Mar. 6-13, 1999, vol. 2, pp. 325-335.

"High-Speed Double-Precision Computation of Reciprocal, Division, Square Root, and Inverse Square Root," Bruguera et al, IEEE Transactions on Computers, vol. 51, No. 12, Dec. 2002.

Owens, John D., et al., "A Survey of General-Purpose Computation on Graphics Hardware," Eurographics 2005, State of Art Reports, pp. 21-51, (Aug. 2005).

Schwarz, Eric M., "FPU Implementations with Denormalized Numbers," IEEE Trans. on Computers, vol. 55. No. 7. pp. 825-835, (Jul. 2005).

He, Hu, et al., "Multiply-Add Fused Float Point Unit with On-fly Denormalized Number Processing," IEEE, pp. 1466-1468, (2005).

Bedard, N., et al., "The Weitek 64-bit Floating-Point Datapath Unit," Weitek Corporation, Maple Press, pp. 898-902, (1988).

Office Action dated May 25, 2011, Japanese Patent Application No. 2007-541334, in related case 019680-012000JP, 3 pages (in Japanese).

Great Britain Examination Report of Mar. 25, 2009 in Application No. GB0821495.9.

Office Action of Jan. 7, 2010 in related U.S. Appl. No. 11/359,353.
Office Action of Dec. 7, 2010 in related U.S. Appl. No. 11/359,353.
Office Action of Jul. 20, 2010 in related U.S. Appl. No. 11/359,353.
Office Action of Oct. 6, 2010 in related U.S. Appl. No. 11/611,800.
Office Action of Feb. 15, 2011 in related U.S. Appl. No. 11/611,800.
Office Action of Dec. 18, 2007 in related U.S. Appl. No. 10/970,253.
Office Action of Jul. 31, 2008 in related U.S. Appl. No. 10/970,253.
Office Action of Oct. 14, 2009 in related U.S. Appl. No. 10/970,253.
Office Action of Aug. 31, 2010 in related U.S. Appl. No. 10/970,253.
Office Action of Feb. 10, 2011 in related U.S. Appl. No. 10/970,253.

* cited by examiner

400

| DOUBLE-PRECISION ARITHMETIC | | 402 |
|---|---|---|
| NAME | INPUTS | RESULT |
| DADD | A,C: fp64 | A+C |
| DMUL | A,B: fp64 | A*B |
| DFMA | A,B,C: fp64 | A*B+C: fp64 |

| DOUBLE-PRECISION COMPARISON | | 404 |
|---|---|---|
| NAME | INPUTS | RESULT |
| DMAX | A,B: fp64 | max(A,B) |
| DMIN | A,B: fp64 | min(A,B) |
| DSET | A,B: fp64 | R: boolean |

| FORMAT CONVERSION & ROUNDING | | 406 |
|---|---|---|
| NAME | INPUT | RESULT |
| D2F | A: fp64 | A': fp32 |
| F2D | A: fp32 | A': fp64 |
| D2I | A: fp64 | A': u/s64 or u/s32 |
| I2D | C: u/s64 or u/s32 | C': fp64 |
| D2D | A: fp64 | A': fp64 |

FIG. 4

FUSED MULTIPLY-ADD FUNCTIONAL UNIT

BACKGROUND OF THE INVENTION

The present invention relates in general to graphics processors and in particular to a double-precision fused multiply-add functional unit for a graphics processor.

Graphics processors are commonly used in computer systems to accelerate rendering of images from two-dimensional or three-dimensional geometry data. Such processors are typically designed with a high degree of parallelism and high throughput, allowing thousands of primitives to be processed in parallel to render complex, realistic animated images in real time. High-end graphics processors provide more computing power than typical central processing units (CPUs).

More recently, there has been interest in leveraging the power of graphics processors to accelerate various computations unrelated to image rendering. A "general-purpose" graphics processor can be used to perform computations in scientific, financial, business and other fields.

One difficulty in adapting graphics processors for general-purpose computations is that graphics processors are usually designed for relatively low numerical precision. High quality images can be rendered using 32-bit ("single-precision") or even 16-bit ("half-precision") floating point values, and the functional units and internal pipelines are configured to support these data widths. In contrast, many general-purpose computations require higher numerical precision, e.g., 64 bits ("double-precision").

To support higher precision, some graphics processors use software techniques to execute double-precision computations using a sequence of machine instructions and 32-bit or 16-bit functional units. This approach slows throughput; for instance, a hundred or more machine instructions might be required to complete a single 64-bit multiplication operation. Such long sequences can significantly reduce the double-precision throughput of the graphics processor. In one representative case, it is estimated that the graphics processor would complete double-precision computations at about ⅕ the throughput possible with a high-end dual-core CPU chip. (By comparison, the same graphics processor can complete single-precision computations at about 15-20 times the throughput of the dual-core CPU.) Because software-based solutions are so much slower, existing graphics processors are rarely used for double-precision computations.

Another solution is simply to make all of the arithmetic circuits of the graphics processor wide enough to handle double-precision operands. This would increase the graphics processor's throughput for double-precision operations to match the single-speed throughput. However, graphics processors typically have dozens of copies of each arithmetic circuit to support parallel operations, and increasing the size of each such circuit would substantially increase the chip area, cost and power consumption.

Still another solution, as described in commonly-owned co-pending U.S. patent application Ser. No. 11/359,353, filed Feb. 21, 2006, is to leverage single-precision arithmetic circuits to perform double-precision operations. In this approach, special hardware included in a single-precision functional unit is used to perform a double-precision operation iteratively. This approach is considerably faster than software-based solutions (throughput might be reduced, e.g., by a factor of 4 relative to single-precision throughput, rather than by a factor of ~100), but it can significantly complicate the chip design. In addition, sharing the same functional unit between single-precision and double-precision operations can result in that unit becoming a bottleneck in the pipeline if too many instructions require the same functional unit.

BRIEF SUMMARY OF THE INVENTION

Embodiments of the present invention directly support double-precision arithmetic in a graphics processor. A multi-purpose double-precision functional unit is provided in addition to the single-precision functional units used for rendering. The double-precision functional unit can execute a number of different operations, including fused multiply-add, on double-precision inputs using data paths and/or logic circuits that are at least double-precision width. The double-precision and single-precision functional units can be controlled by a shared instruction issue circuit, and the number of copies of the double-precision functional unit included in a core can be less than the number of copies of the single-precision functional units, thereby reducing the effect of adding support for double-precision on chip area.

According to one aspect of the present invention, a graphics processor has a rendering pipeline adapted to generate image data. The rendering pipeline, which operates on single-precision operands, includes a processing core adapted to execute a number of concurrent threads. The processing core includes a multipurpose double-precision functional unit adapted to selectably execute one of a number of double-precision operations on a set of double-precision input operands. The multipurpose double-precision functional unit includes at least one arithmetic logic circuit, and all of the arithmetic logic circuits of the double-precision functional unit are sufficiently wide to operate at double-precision. In some embodiments, the double-precision functional unit is adapted such that each of the double-precision operations completes in a same number of clock cycles, and the unit may also be adapted such that a time (e.g., number of clock cycles) required to complete any one of the of double-precision operations is not affected by an underflow or overflow condition.

Various operations and combinations of double-precision operations can be supported. In one embodiment, the double-precision operations include an addition operation that adds two double-precision operands; a multiplication operation that multiplies two double-precision operands; and a fused multiply add operation that computes a product of a first double-precision operand and a second double-precision operand, then adds a third double-precision operand to the product. Other double-precision operations that can be supported include a double-precision comparison (DSET) operation that performs a comparison test on a first operand and a second operand and generates a Boolean result indicating whether the comparison test is satisfied, a double-precision maximum (DMAX) operation that returns a larger one of two double-precision input operands, or a double-precision minimum (DMIN) operation that returns a smaller one of two double-precision input operands. In addition, format conversion operations that convert an operand from a double-precision format to a non double-precision format (or vice versa) can also be supported.

According to another aspect of the present invention, a graphics processor includes a rendering pipeline adapted to generate image data. The rendering pipeline including a processing core adapted to execute multiple concurrent threads. The processing core includes a single-precision functional unit adapted to execute an arithmetic operation on one or more single-precision operands and a double-precision fused multiply add (DFMA) functional unit adapted to execute a fused multiply add operation on a set of double-precision input operands and to provide a double-precision result. The DFMA functional unit advantageously includes a DFMA pipeline having data paths wide enough to perform the fused multiply add operation in a single pass through the DFMA pipeline. For example, the DFMA functional unit may include a multiplier adapted to compute a product of two double-precision mantissas in a single iteration and an adder adapted to compute a sum of two double-precision mantissas in a single iteration.

The DFMA functional unit can also be configured to execute other operations. For instance, in some embodiments the DFMA is configured to execute a multiplication operation on a pair of double-precision input operands and to provide a double-precision result. In some embodiments, the multiplication operation and the fused multiply add operation are each completed in a same number of clock cycles. Similarly, the DFMA functional unit can be configured to execute an addition operation on a pair of double-precision input operands and to provide a double-precision result. In one embodiment, the addition operation and the fused multiply add operation are each completed in a same number of clock cycles.

In some embodiments, the processing core includes a number (P) of copies of the first functional unit adapted to operate in parallel and a number (N) of copies of the DFMA functional unit, the number P being larger than the number N. In one embodiment, the number N is one.

The processing core may include an input manager circuit adapted to collect P sets of double-precision input operands for the DFMA functional unit and to deliver different ones of the P sets of double-precision operands to the DFMA functional unit on different (e.g., successive) clock cycles. The input manager circuit may also be adapted to collect P sets of single-precision input operands for the first functional unit and to deliver, in parallel, a different one of the P sets of single-precision operands to each one of the P copies of the first functional unit.

The following detailed description together with the accompanying drawings will provide a better understanding of the nature and advantages of the present invention.

BRIEF DESCRIPTION OF THE DRAWINGS

FIG. 4 lists double-precision arithmetic, comparison operations, and format conversion operations that can be performed by a double-precision functional unit according to an embodiment of the present invention;

DETAILED DESCRIPTION OF THE INVENTION

Embodiments of the present invention provide graphics processors that include dedicated double-precision (e.g., 64-bit) functional units. In one embodiment, a double-precision functional unit is capable of performing addition, multiplication and fused-multiply add operations, as well as double-precision comparisons and format conversions to and from double-precision formats.

I. System Overview

A. Computer System Overview

Figure 1:
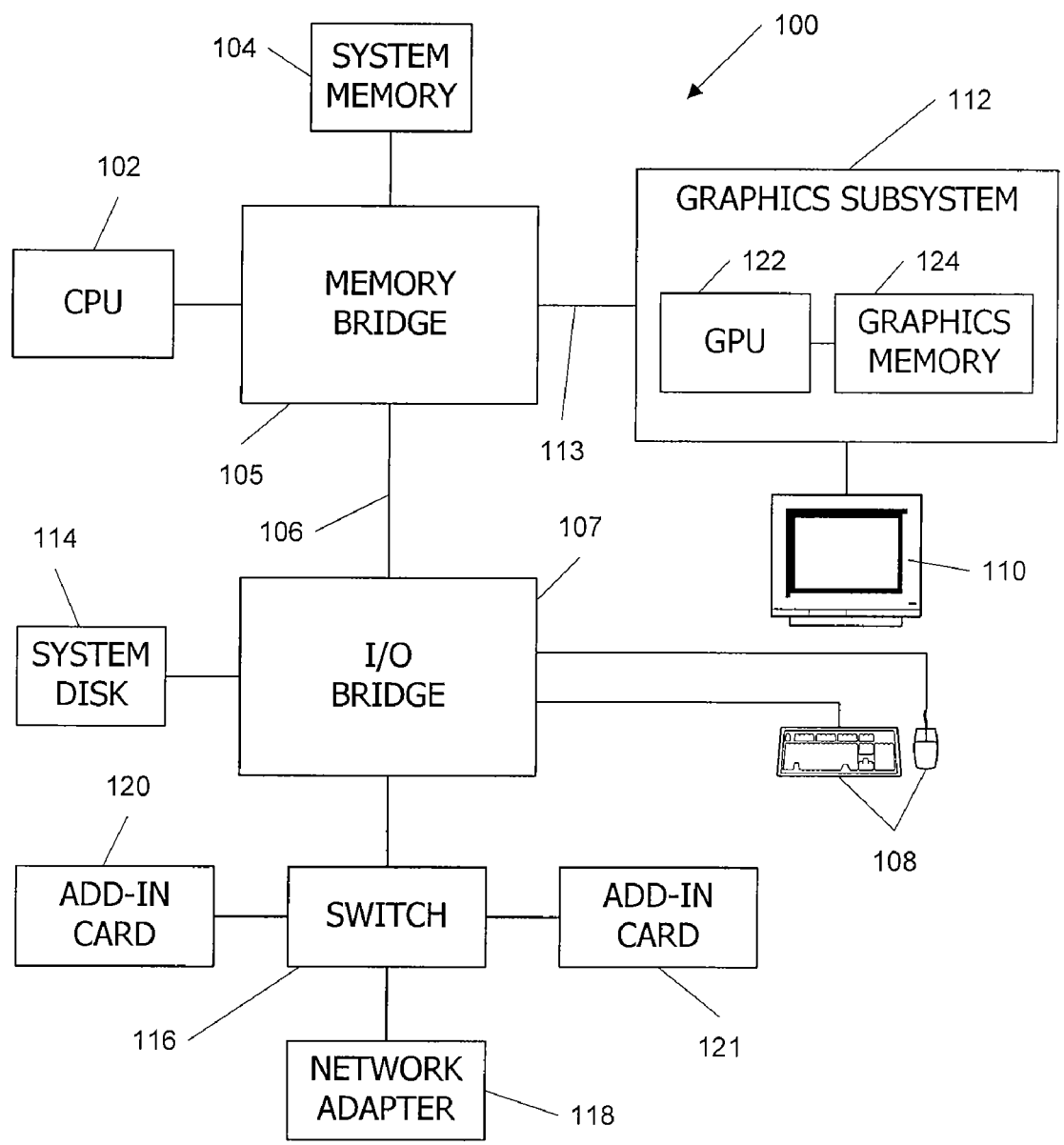
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

GPU 122 is also configurable to perform general-purpose computations for data processing tasks including tasks related to graphics applications (e.g., physics modeling for a video game or the like) as well as tasks unrelated to graphics applications. For general-purpose computations, GPU 122 advantageously reads input data from system memory 104 or graphics memory 124, executes one or more programs to process the data, and writes output data back to system memory 104 or graphics memory 124. GPU 122 advantageously includes one or more double-precision fused multiply-add units (not shown in FIG. 1) for use in general-purpose computations, in addition to other single-precision functional units that are used during rendering operations.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. In still other embodiments, some or all elements of GPU 122 may be integrated with CPU 102.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices, or one GPU can be operated to generate images while another GPU performs general-purpose computations, including double-precision computations as described below.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

B. Rendering Pipeline Overview

Figure 2:
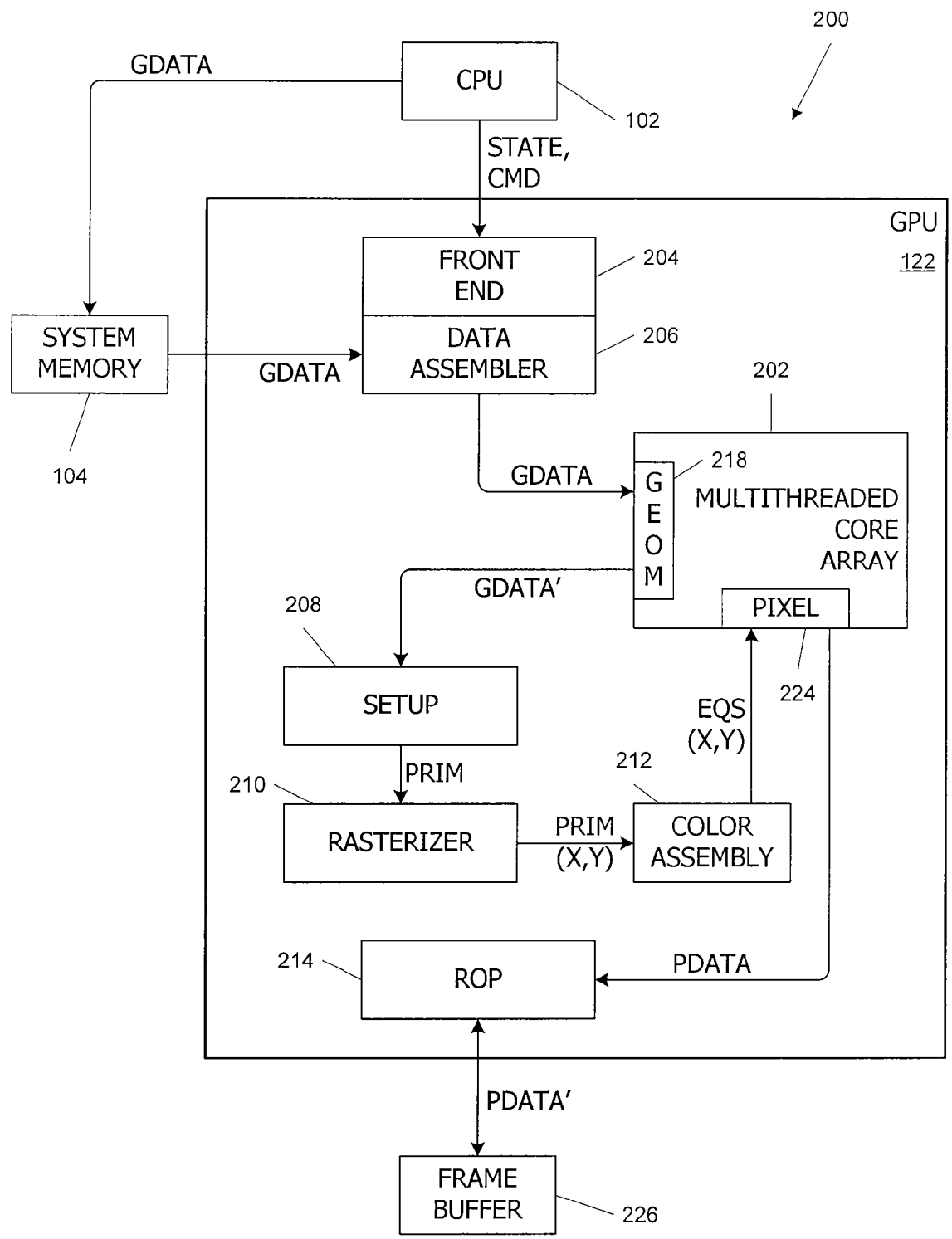
FIG. 2 is a block diagram of a rendering pipeline that can be implemented in a graphics processing unit according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable graphics-related programs (e.g., vertex shaders, geometry shaders, and/or pixel shaders) and general-purpose computation programs are executed using the same parallel-processing hardware, referred to herein as a "multithreaded core array" 202.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

For rendering operations, front end 204 receives state information (STATE), commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. For rendering operations, the state information, commands, and geometry data may be of a generally conventional nature and may be used to define the desired rendered image or images, including geometry, lighting, shading, texture, motion, and/or camera parameters for a scene.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. In some embodiments, vertex shader programs and geometry shader programs are executed using the same programmable processing cores in multithreaded core array 202. Thus, at certain times, a given processing core may operate as a vertex shader, receiving and executing vertex program instructions, and at other times the same processing core may operates as a geometry shader, receiving and executing geometry program instructions. The processing cores can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a pixel shader program to calculate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C) for each primitive that covers at least one sampling location of a pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

For general-purpose computations, multithreaded core array can be controlled by pixel module 224 (or by geometry module 218). Front end 204 receives state information (STATE) and processing commands (CMD), e.g., from CPU 102 of FIG. 1 and delivers the state information and commands via a control path (not explicitly shown) to a work distribution unit that can be incorporated, e.g., into color assembly module 212 or pixel module 224. The work distribution unit distributes processing tasks among the processing cores making up multithreaded core array 202. Various work distribution algorithms may be used.

Each processing task advantageously includes executing a number of processing threads, where each thread executes the same program. The program advantageously includes instructions to read input data from "global memory" (e.g., system memory 104, graphics memory 124, or any other memory accessible to both GPU 122 and CPU 102), perform various operations including at least some double-precision operations on the input data to produce output data, and write the output data to global memory. Particular processing tasks are not critical to the present invention.

It will be appreciated that the rendering pipeline described herein is illustrative and that variations and modifications are possible. The pipeline may include different units from those shown and the sequence of processing events may be varied from that described herein. Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

C. Core Overview

Multithreaded core array 202 advantageously includes one or more processing cores adapted for parallel execution of a large number of processing threads, where the term "thread" refers to an instance of a particular program executing on a particular set of input data. For example, a thread can be an instance of a vertex shader program executing on the attributes of a single vertex, a pixel shader program executing on a given primitive and pixel, or an instance of a general-purpose computation program.

Figure 3:
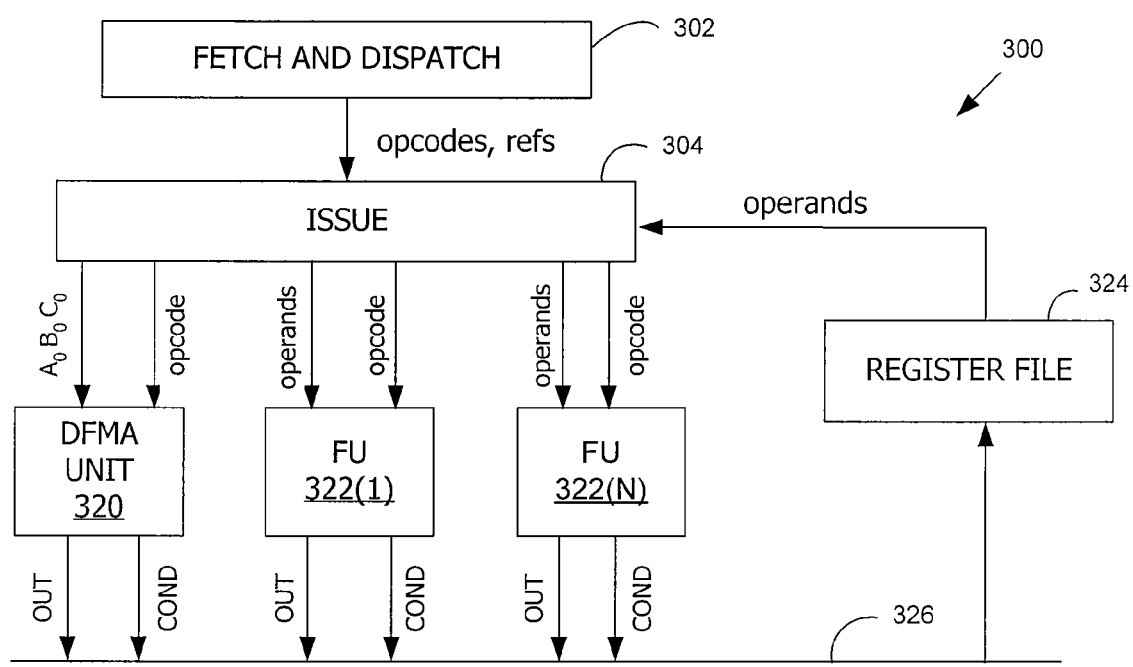
FIG. 3 is a block diagram of an execution core according to an embodiment of the present invention.

FIG. 3 is a block diagram of an execution core 300 according to an embodiment of the present invention. Execution core 300, which may be implemented, e.g., in multithreaded core array 202 described above, is configured to execute arbitrary sequences of instructions for performing various computations. In some embodiments, the same execution core 300 can be used to execute shader programs at all phases of graphics rendering, including vertex shader, geometry shader, and/or pixel shader programs, as well as general-purpose computation programs.

Execution core 300 includes a fetch and dispatch unit 302, an issue unit 304, a double-precision fused multiply-add (DFMA) unit 320, a number (N) of other functional units (FU) 322, and a register file 324. Each functional unit 320, 322 is configured to perform specified operations. In one embodiment, DFMA unit 320 advantageously implements a double-precision fused multiply-add operation in addition to other double-precision operations as described below. It is to be understood that any number of DFMA units 320 can be included in a core 300.

The other functional units 322 may be of generally conventional design and may support a variety of operations such as single-precision addition, multiplication, bitwise logic operations, comparison operations, format conversion operations, texture filtering, memory access (e.g., load and store operations), approximation of transcendental functions, interpolation, and so on. Functional units 320, 322 may be pipelined, allowing a new instruction to be issued before a previous instruction has finished, as is known in the art. Any combination of functional units may be provided.

During operation of execution core 300, fetch and dispatch unit 302 obtains instructions from an instruction store (not shown), decodes them, and dispatches them as opcodes with associated operand references or operand data to issue unit 304. For each instruction, issue unit 304 obtains any referenced operands, e.g., from register file 324. When all operands for an instruction are ready, issue unit 304 issues the instruction by sending the opcode and operands to DFMA unit 320 or another functional unit 322. Issue unit 304 advantageously uses the opcode to select the appropriate functional unit to execute a given instruction. Fetch and dispatch unit 302 and issue unit 304 may be implemented using conventional microprocessor architectures and techniques, and a detailed description is omitted as not being critical to understanding the present invention.

DFMA unit 320 and other functional units 322 receive the opcodes and associated operands and perform the specified operation on the operands. Result data is provided in the form of result values that can be forwarded to register file 324 (or another destination) via a data transfer path 326. Register file 324 in some embodiments includes a local register file with sections allocated to specific threads as well as a global register file that allows data to be shared between threads. Register file 324 can be used to store input data, intermediate results, and the like during program execution. A particular implementation of register file 324 is not critical to the present invention.

In one embodiment, core 300 is multithreaded and can execute up to a maximum number (e.g., 384, 768) of threads concurrently, e.g., by maintaining current state information associated with each thread. Core 300 is advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

It will be appreciated that the execution core of FIG. 3 is illustrative and that variations and modifications are possible. Any number of cores may be included in a processor, and any number of functional units may be included in a core. Fetch and dispatch unit 302 and issue unit 304 may implement any desired microarchitecture, including scalar, superscalar or vector architectures with in-order or out-of-order instruction issue; speculative execution modes; single-instruction, multiple data (SIMD) instruction issue; and so on as desired. In some architectures, the issue unit may receive and/or issue a long instruction word that includes opcodes and operands for multiple functional units or multiple opcodes and/or operands for one functional unit. In some architectures, the execution core may include multiple instances of each functional unit operable in parallel, e.g., for execution of SIMD instructions. The execution core may also include a sequence of pipelined functional units in which results from functional units in one stage are forwarded to functional units in later stages rather than directly to a register file; the functional units in such a configuration can be controlled by a single long instruction word or separate instructions.

Additionally, persons of ordinary skill in the art with access to the present teachings will recognize that DFMA unit 320 can be implemented as a functional unit in any microprocessor, not limited to graphics processors or to any particular processor or execution core architecture. For instance, DFMA unit 320 could be implemented in a general-purpose parallel processing unit or a CPU.

C. DFMA Unit Overview

In accordance with one embodiment of the present invention, execution core 300 includes a DFMA unit 320 that executes three classes of operations: double-precision arithmetic, comparison operations, and format conversions between double-precision and other formats.

DFMA unit 320 advantageously handles inputs and outputs in double-precision floating-point format and, for conversion operations, in other floating-point and fixed-point formats; operands for different operations can be in different formats. Before describing an embodiment of DFMA unit 320, representative formats will be defined.

"Fp32", as used herein, refers to the standard IEEE 754 single-precision floating-point format, in which a normal floating point number is represented by a sign bit, eight exponent bits, and 23 significand bits. The exponent is biased upward by 127 so that exponents in the range $2^{-126}$ to $2^{127}$ are represented using integers from 1 to 254. For "normal" numbers, the 23 significand bits are interpreted as the fractional portion of a 24-bit mantissa with an implied 1 as the integer portion. (The term "significand" is used herein when the leading 1 is implied, while "mantissa" is used to denote that, if applicable, the leading 1 has been made explicit.)

"Fp64," as used herein refers to the standard IEEE 754 double-precision floating-point format, in which a normal floating point number is represented by a sign bit, 11 exponent bits and 52 significand bits. The exponent is biased upward by 1023 so that exponents in the range $2^{-1022}$ to $2^{1023}$ are represented using integers from 1 to 2046. For "normal" numbers the 52 significand bits are interpreted as the fractional portion of a 53-bit mantissa with an implied 1 as the integer portion.

"Fp16," as used herein refers to a "half-precision" floating-point format commonly used in graphics, in which a normal floating point number is represented by a sign bit, 5 exponent bits and 10 significand bits. The exponent is biased upward by 15 so that exponents in the range $2^{-14}$ to $2^{15}$ are represented using integers from 1 to 30. For "normal" numbers the significand bits are interpreted as the fractional portion of an 11-bit mantissa with an implied 1 as the integer portion.

In fp16, fp32 and fp64 formats, numbers with all zeroes in the exponent bits are referred to as denormalized numbers (or "denorms") and are interpreted as not having an implied leading 1 in the mantissa; such numbers may represent, e.g., an underflow in a computation. The (positive or negative) number with all ones in the exponent bits and zeroes in the significand bits are referred to as (positive or negative) INF; this number may represent, e.g., an overflow in a computation. Numbers with all ones in the exponent bits and a non-zero number in the significand bits are referred to as Not a Number (NaN) and may be used, e.g., to represent a value that is undefined. Zero is also considered a special number and is represented by all of the exponent and significand bits being set to zero. Zero can have either sign; thus both positive and negative zero are allowed.

Fixed-point formats are specified herein by an initial "s" or "u" indicating whether the format is signed or unsigned and a number denoting the total number of bits (e.g., 16, 32, 64); thus, s32 refers to signed 32-bit format, u64 to an unsigned 64-bit format and so on. For the signed formats, two's complement representation is advantageously used. In all formats used herein, the most significant bit (MSB) is at the left of the bit field and the least significant bit (LSB) is at the right.

It is to be understood that these formats are defined and referred to herein for purposes of illustration and that a DFMA unit might support any combination of these formats or different formats without departing from the scope of the present invention. In particular, it is to be understood that "single-precision" and "double-precision" can refer to any two different floating-point formats, not limited to currently defined standards; a double-precision format (e.g., fp64) refers to any format that uses a larger number of bits than a related single-precision format (e.g., fp32) to represent a larger range of floating-point numbers and/or to represent floating-point values to a higher degree of precision. Similarly, "half-precision" can refer generally to a format that uses fewer bits than a related single-precision format to represent a smaller range of floating-point numbers and/or to represent floating-point numbers with a lower degree of precision.

An embodiment of DFMA unit 320 according to the present invention will now be described. FIG. 4 is a table 400 listing double-precision arithmetic, comparison operations, and format conversion operations that can be performed by this embodiment of DFMA unit 320.

Section 402 lists arithmetic operations. Addition (DADD) adds two fp64 inputs A and C and returns the fp64 sum A+C. Multiplication (DMUL) multiplies two fp64 inputs A and B and returns the fp64 product A*B. Fused multiply-add (DFMA) receives three fp64 inputs A, B and C and computes A*B+C. The operation is "fused" in that the product A*B is not rounded before being added to C; using the exact value A*B improves accuracy and complies with the forthcoming IEEE 754R standard for floating-point arithmetic.

Section 404 lists comparison operations. A maximum operation (DMAX) returns the larger of fp64 operands A and B, and a minimum operation (DMIN) returns the smaller of the two. The binary test operation (DSET) performs one of a number of binary relationship tests on double-precision operands A and B and returns a Boolean value indicating whether the test is satisfied. In this embodiment, the binary relationships that can be tested include greater than (A>B), less than (A<B), equal to (A=B), and unordered (A?B, which is true if either A or B is NaN), as well as negations (e.g., A≠B), and various combination tests (such as A≧B, A<>B, A?=B, and so on)

Section 406 lists format conversions and rounding operations. In this embodiment, DFMA unit 320 can convert fp64 format numbers to numbers in other 64-bit or 32-bit formats and vice versa. The D2F operation converts operand A from fp64 to fp32; F2D converts operand A from fp32 to fp64. The D2I operation converts operand A from fp64 to any one of s64, u64, s32, and u32 formats; it is to be understood that distinct opcodes may be used to identify the target format. The I2D operation converts integer operand C from any one of s64, u64, s32, and u32 formats to fp64 format; again, it is to be understood that distinct opcodes may be used to identify the source format. In this embodiment, all conversions to or from double-precision format are supported by DFMA unit 320; other functional units may perform other format conversions (e.g., between fp32 and fp16, between fp32 and integer formats, etc.).

The D2D operation is used to apply rounding operations, such as the IEEE rounding modes, to an fp64 operand. These operations round the fp64 operand to an integer value represented in fp64 format. In one embodiment, the supported D2D operations include truncation (rounding toward zero), ceiling (rounding toward +INF), floor (rounding toward −INF), and nearest (rounding up or down to the nearest integer).

In this embodiment, DFMA unit 320 does not provide direct hardware support for more advanced mathematical functions such as division, remainder, or square root. However, DFMA unit 320 can be used to accelerate software-based implementations of these operations. For example, one common approach to division estimates a quotient q=a/b, then uses t=q*b−a to test the estimate. If t is zero, the quotient q has been correctly determined. If not, the size of t is used to modify the estimated quotient q and the test is repeated until t becomes zero. The test result t for each iteration can be computed exactly using a single DFMA operation (with A=q, B=b, C=−a). Similarly, for square roots, one common approach is to estimate $r=a^{1/2}$ then compute t=r*r−a to test the estimate and modify r if t is not zero. Again, the test result t for each iteration can be computed exactly using a single DFMA operation (with A=B=r, C=−a).

Sections II and III describe a DFMA unit 320 that can perform all of the operations shown in FIG. 4. Section II describes a circuit structure for DFMA unit 320, and Section III describes how that circuit structure can be used to execute the operations listed in FIG. 4. It is to be understood that the DFMA unit 320 described herein is illustrative and that other or different combinations of functions might be supported using appropriate combinations of circuit blocks.

II. DFMA Unit Structure

Figure 5:
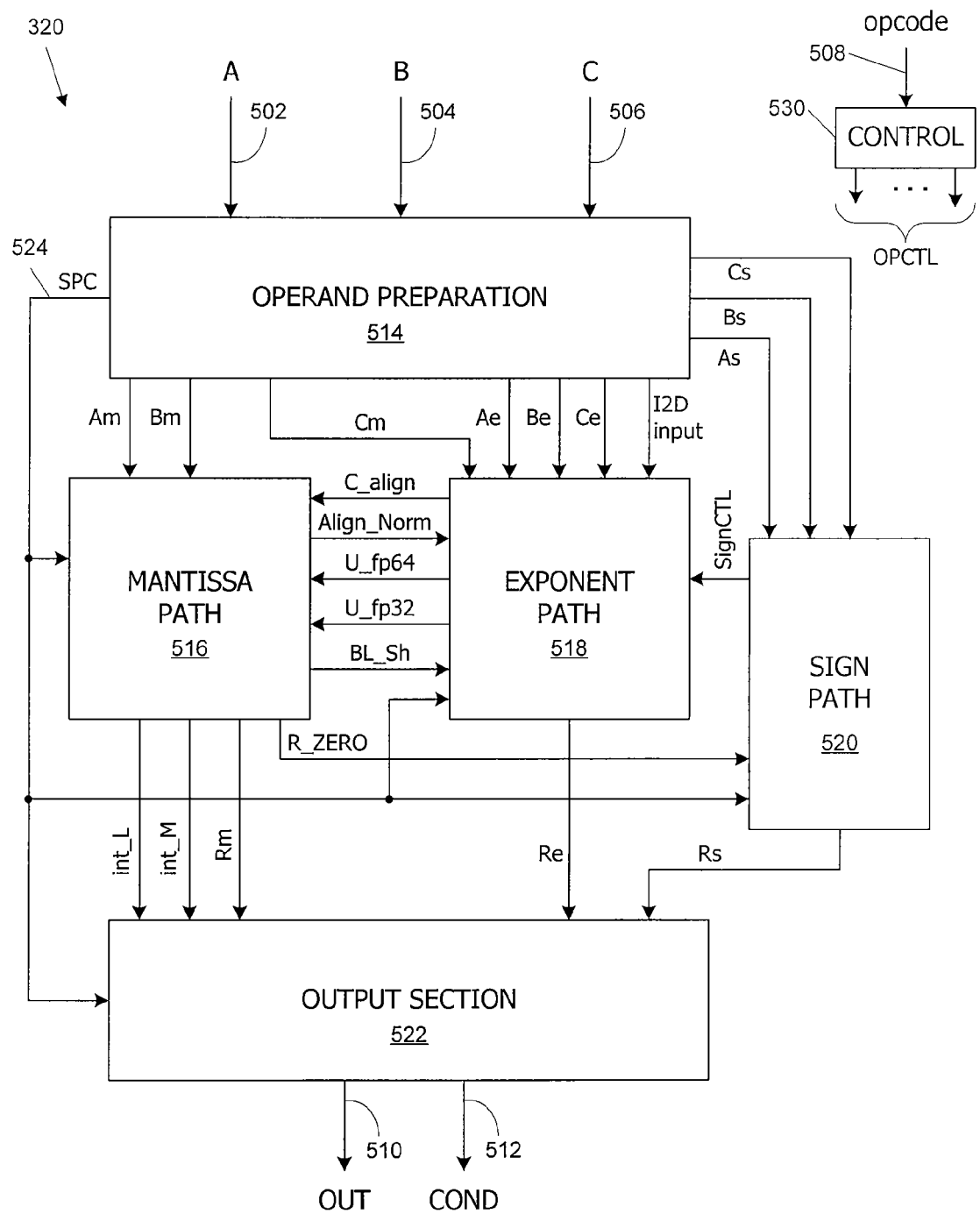
FIG. 5 is a simplified block diagram of a double-precision functional unit according to an embodiment of the present invention.

FIG. 5 is a simplified block diagram of a DFMA unit 320 according to an embodiment of the present invention that supports all operations shown in FIG. 4. In this embodiment, DFMA unit 320 implements a multi-stage pipeline that is used for all operations. On each processor cycle, DFMA unit 320 can receive (e.g., from issue unit 304 of FIG. 3) three new operands ($A_0$, $B_0$, $C_0$) via operand input paths 502, 504, 506 and an opcode indicating the operation to be performed via opcode path 508. In this embodiment, the operation may be any operation shown in FIG. 4. In addition to the operation, the opcode advantageously indicates the input format for the operands and also the output format to use for the result, which might or might not be same as the input format. It should be noted that an operation shown in FIG. 4 may have multiple opcodes associated with it; e.g., there may be one opcode for D2I with an s64 output and a different opcode for D2I with a s32 output, etc.

DFMA unit 320 processes each operation through all of its pipeline stages and produces a 64-bit (or 32-bit for certain format-conversion operations) result value (OUT) on signal path 510 and a corresponding condition code (COND) on signal path 512. These signals may be propagated, e.g., to register file 324 as shown in FIG. 3, to issue unit 304, or to other elements of a processor core, depending on the architecture. In one embodiment, a pipeline stage corresponds to a processor cycle; in other embodiments, a stage may encompass multiple processor cycles. In addition, different paths within the pipeline advantageously operate in parallel.

Section II.A provides an overview of the DFMA pipeline, and Sections II.B-I describe the circuit blocks of each section in detail.

A. DFMA Pipeline

An initial understanding of the pipeline can be had with reference to how the circuit blocks are used during a DFMA operation. Operand preparation block 514 performs operand formatting (for operands not already in fp64 format) and special number detection; operand preparation block 514 also extracts the mantissas (Am, Bm, Cm), exponents (Ae, Be, Ce), and sign bits (As, Bs, Cs) from input fp64 operands. In one embodiment, there are no illegal operand combinations; any operands not used in a particular operation may simply be ignored.

Mantissa path 516 computes the product of mantissas Am and Bm. In parallel, exponent path 518 uses exponents Ae and Be to determine the relative alignment between the product A*B and operand C and supplies an aligned mantissa for operand C (C_align) to mantissa path 516. Mantissa path 516 adds C_align to the product Am*Bm, then normalizes the result. Based on the normalization, mantissa path 516 provides an alignment signal (ALIGN_NORM) back to exponent path 518, which uses the ALIGN_NORM signal together with the exponents Ae, Be and Ce to determine an exponent for the final result.

Sign path 520 receives the sign bits As, Bs and Cs from operand preparation block 514 and determines the sign of the result. Mantissa path 516 detects cases where the result is zero and signals the zero result (R_ZERO) to sign path 520.

Output section 522 receives a result mantissa Rm from mantissa path 516, a result exponent Re from exponent path 518, and a result sign Rs from sign path 520. Output section 522 also receives special number signals (SPC) from operand preparation block 514. Based on this information, output section 522 formats the final result (OUT) for delivery onto output path 510 and generates a condition code (COND) on output path 512. The condition code, which advantageously includes fewer bits than the result, carries general information about the nature of the result. For example, the condition code may include bits indicating whether the result is positive, negative, zero, NaN, INF, denorm, and so on. As is known in the art, where a condition code is provided with a result, subsequent consumers of that result can sometimes use the condition code rather than the result itself in their processing. In some embodiments, the condition code may be used to indicate the occurrence of an exception or other event during execution of the operation. In other embodiments, the condition code may be omitted entirely.

It is to be understood that while names such as "mantissa path" and "exponent path" may suggest functions performed during certain operations (e.g., DFMA) by the various circuit blocks of each path, circuit blocks along any of the internal data paths may be leveraged for a variety of uses in an operation-dependent manner. Examples are described below.

In addition to the data paths, DFMA unit 320 also provides a control path, represented in FIG. 5 by a control block 530. Control block 530 receives the opcode and generates various opcode-dependent control signals, denoted generally herein as "OPCTL," that can be propagated to each circuit block in synchronization with data propagation through the pipeline. (The connection of OPCTL signals into the various circuit blocks is not shown in FIG. 5.) As described below, OPCTL signals can be used to enable, disable, and otherwise control the operation of various circuit blocks of DFMA unit 3220 in response to the opcode so that different operations can be performed using the same pipeline elements. The various OPCTL signals referred to herein can include the opcode itself or some other signal derived from the opcode, e.g., by combinatorial logic implemented in control block 530. In some embodiments, control block 530 may be implemented using multiple circuit blocks in several pipeline stages. It is to be understood that the OPCTL signals provided to different blocks during a given operation may be the same signal or different signals. In view of the present disclosure, persons of ordinary skill in the art will be able to construct suitable OPCTL signals.

It should be noted that the circuit blocks for a given stage may require different amounts of processing time and that the time required at a particular stage might vary from one operation to another. Accordingly, DFMA unit 320 may also include various timing and synchronization circuits (not shown in FIG. 5) to control propagation of data on different paths from one pipeline stage to the next. Any appropriate timing circuitry (e.g., latches, transmission gates, etc.) may be used.

A. Operand Preparation

Figure 6:
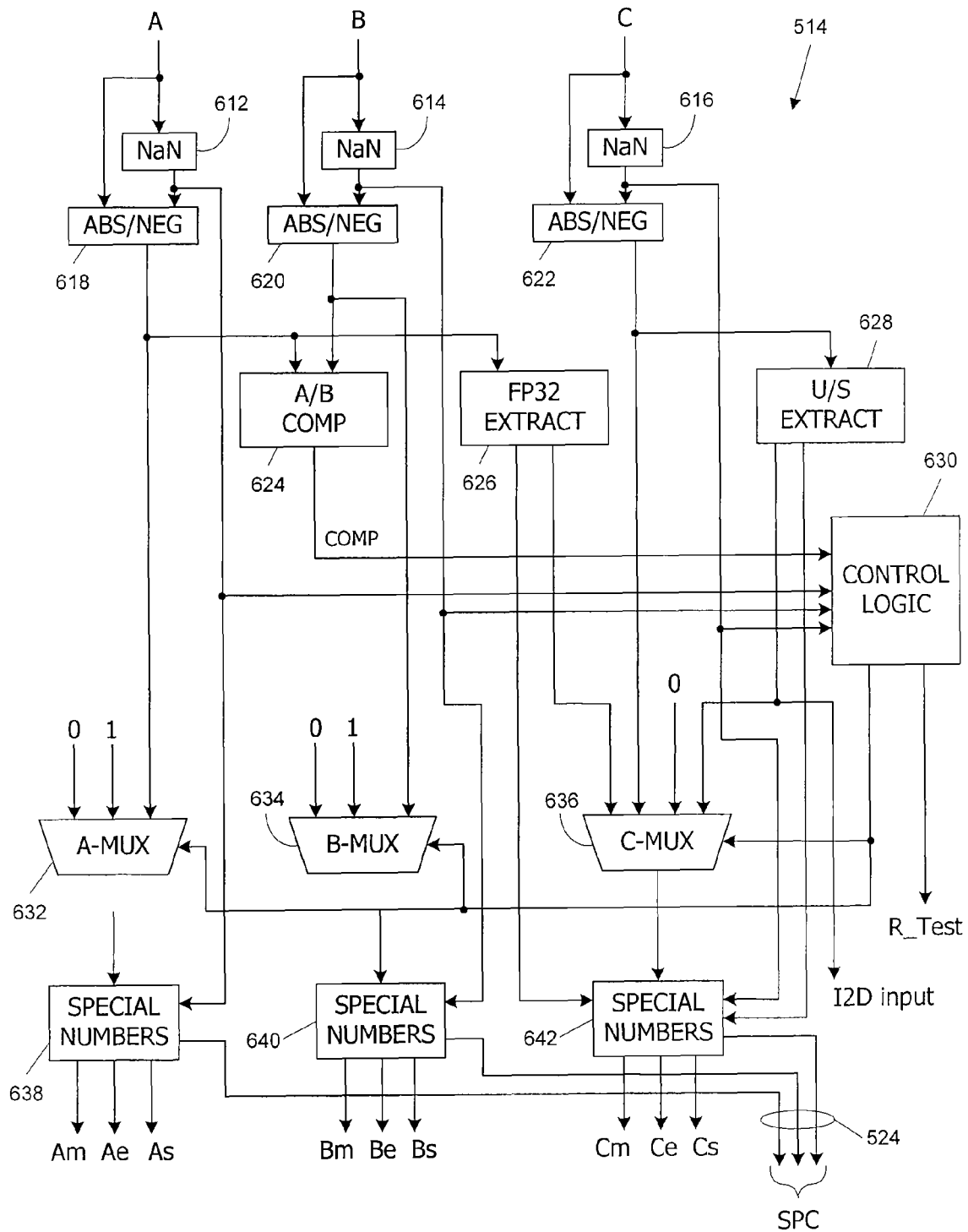
FIG. 6 is a block diagram of an operand preparation block for the double-precision functional unit of FIG. 5.

FIG. 6 is a block diagram of operand preparation block 514 according to an embodiment of the present invention. Operand preparation block 514 receives the input operands A, B and C and provides the mantissa portions (Am, Bm, Cm) to mantissa path 516, the exponent portions (Ae, Be, Ce) to exponent path 518, and the sign bits (As, Bs, Cs) to sign path 520.

The operands A, B and C are received at respective NaN detection blocks 612, 614, 616 and respective absolute value/ negation blocks 618, 620, 622. Each NaN detection block 612, 614, 616 determines whether the received operand is a NaN (all ones in the exponent bits and a non-zero number in the significand bits) and generates a corresponding control signal.

Absolute value/negation blocks 618, 620, 622 are usable to invert the sign bit of the operands in response to OPCTL signals (not explicitly shown). For example, any of the operations listed in FIG. 4 might specify that the negative of an operand or absolute value of an operand is to be used. Blocks 618, 620, 622 can invert the sign bit to negate an operand or force the sign bit to the non-negative state (zero for IEEE 754 formats). If an input operand is a NaN, the appropriate absolute value/negation block 618, 620, 622 also "quiets" the NaN (e.g., by setting the leading bit of the significand to 1), keeping the sign bit. Absolute value/negation blocks 618, 620, 622 provide their respective outputs to operand selection muxes 632, 634, 636.

For double-precision arithmetic, the operands A, B and C produced by absolute value/negation blocks 618 can be used directly. For comparison operations, an A/B comparison circuit 624 compares operands A and B. In one embodiment, absolute value/negation circuit 620 negates operand B and A/B comparison circuit 624 computes the sum of A and −B as if they were fixed-point numbers. If the result is positive, then A is greater than B; if the result is negative, A is less than B; if the result is zero, A is equal to B. A/B comparison circuit 624 may also receive NaN information from NaN detection circuits 612 and 614 (these paths are not explicitly shown in FIG. 6). If either A or B (or both) is NaN, then A and B are "unordered." The result information is provided to control logic 630. Control logic 630 provides the result information as a signal R_TEST to output section 522 and also provides control signals to operand selection muxes 632, 634, 636.

For format conversion operands, the input might not be in fp64 format. An fp32 extraction circuit 626 is active during F2D operations. Fp32 extraction circuit 626 receives operand A and performs all tests for non-normal fp32 inputs. Fp32 extraction circuit 626 also expands the significand field of the received operand from 23 bits to 52 bits (e.g., by adding trailing zeroes). Fp32 extraction circuit 626 expands the 8-bit fp32 exponent to 11 bits, and increases the exponent bias from 127 to 1023 (e.g., by adding 896 to the fp32 exponent).

An unsigned/signed (U/S) extraction circuit 628 is active during I2D operations. U/S extraction circuit 628 receives fixed-point operand C in any of u32, s32, u64 or s64 formats and prepares it for conversion to fp64. U/S extraction circuit 628 converts the fixed-point operand from 1's complement (or 2's complement) form to sign-magnitude form and prepends or appends zeroes to align the operand in the significand field. U/S extraction circuit 628 provides its output to operand selection mux 636 and also to exponent path 518 as an I2D input signal.

Operand selection muxes 632, 634, 636 respond to signals from control logic 630 to select operands A, B and C. Operand selection mux 632 selects between operand A from absolute value/negation circuit 618 and constant values 0.0 and 1.0 (expressed in fp64 format). For DMUL and DFMA operations, operand A is selected. For DMIN (DMAX) operations, operand A is selected if A<B (A>B); otherwise 1.0 is selected. For DADD and I2D operations, 0.0 is selected.

Operand selection mux 634 selects between operand B from absolute value/negation circuit 620 and constant values 0.0 and 1.0 (expressed in fp64 format). For DMUL and DFMA operations, operand B is selected. For DMIN (DMAX) operations, operand B is selected if B<A (B>A); otherwise 1.0 is selected. For DADD and I2D operations, 0.0 is selected.

Operand selection mux 636 selects among operand C from absolute value/negation circuit 622, an extracted fp32 value from fp32 extraction circuit 626, an extracted unsigned or signed integer value from U/S extraction circuit 628, and a constant value 0.0 (expressed in fp64 format). For DADD and DFMA operations, operand C is selected. For DMUL and comparison operations, constant 0.0 is selected. For F2D operations, the extracted fp32 value from fp32 extraction circuit 626 is selected, and for I2D operations, the extracted u/s value from U/S extraction circuit 628 is selected.

The operands A, B and C selected by selection muxes 632, 634, 636 are provided to special number detection circuits 638, 640, 642. For fp64 operands, special number detection circuits 638, 640, 642 detect all special number conditions, including denorms, NaN, INF and zero. For F2D operations, special number detection circuit 642 receives the fp32 special number information from fp32 extraction circuit 626 via a path 644. Each special number detection circuit 638, 640, 642 generates a special number signal (SPC) indicating whether the operand is a special number and if so, which type. Special number signals SPC are provided to output section 522 on signal path 524, as shown in FIG. 5. Special number detection logic of generally conventional design may be used. In one alternative embodiment, NaN detection (performed by circuits 612, 614 and 616) is not repeated in circuits 638, 640, 642; instead, each special number detection circuit 638, 640, 642 receives a NaN signal from the corresponding one of NaN detection circuits 612, 614 and 616 and uses that signal to determine whether the operand is NaN.

Regardless of whether any special numbers are detected, special number detection circuits 638, 640 and 642 separate the operands into mantissa, exponent and sign bits. Special number detection circuit 638 provides the mantissa portion of operand A (Am) to mantissa path 516 (FIG. 5), the exponent portion of operand A (Ae) to exponent path 518, and the sign bit (As) to sign path 520. Special number detection circuit 640 provides the mantissa portion of operand B (Bm) to mantissa path 516, the exponent portion of operand B (Be) to exponent path 518, and the sign bit (Bs) to sign path 520. Special number detection circuit 642 provides the mantissa portion (Cm) and the exponent portion (Ce) of operand C to exponent path 518, and the sign bit (Cs) to sign path 520. In some embodiments, special number detection circuits 638, 640, 642 append leading 1s to the mantissas Am, Bm, Cm (except where the number is a denorm).

B. Exponent Path

Figure 7:
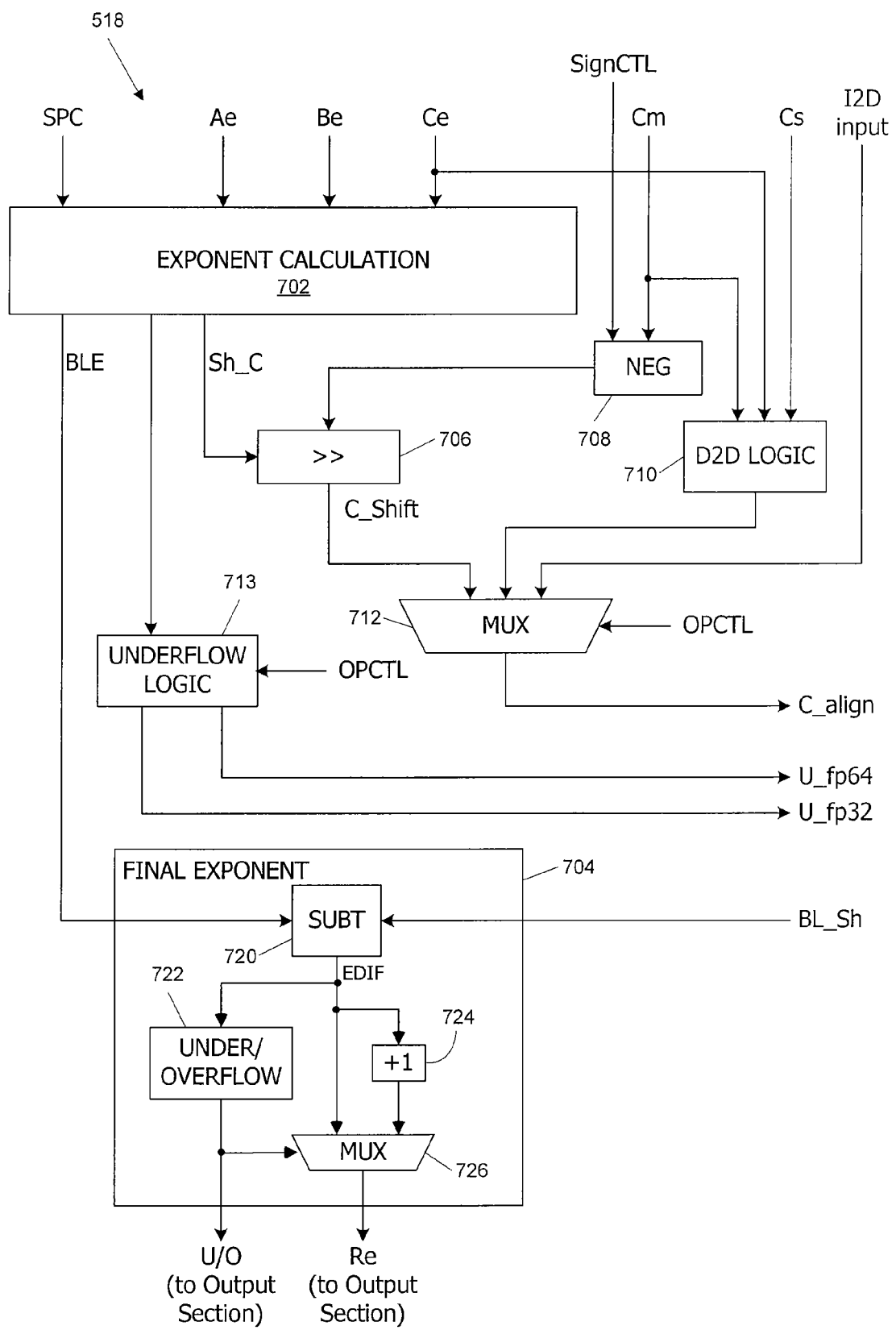
FIG. 7 is a block diagram of an exponent path for the double-precision functional unit of FIG. 5.

FIG. 7 is a block diagram of exponent path 518 according to an embodiment of the present invention.

An exponent calculation circuit 702 receives exponent bits Ae, Be, and Ce from operand preparation block 514 (FIG. 5) and computes a block exponent for the DFMA result A*B+C. Conventional exponent calculation circuits may be used. In one embodiment, if all operands are normal numbers, exponent calculation circuit adds Ae and Be and subtracts the fp64 exponent bias (1023) to determine an exponent for the product A*B, then selects the larger of the product exponent and exponent Ce as the block exponent (BLE) for the DFMA result. This block exponent BLE is provided to a downstream final exponent computation circuit 704. If one or more operands is non-normal (as indicated by the special number signals SPC), appropriate logic may be used to determine block exponent BLE. In other embodiments, exponent determination for operations involving special numbers is handled in output section 522 as described below.

In addition, exponent calculation block 702 determines an amount by which the mantissa of operand C is to be effectively shifted left or right to align Cm with the product Am*Bm. This amount is provided as a Sh_C control signal to a shift circuit 706. This control signal advantageously accounts for extra padding of Cm so that an effective left or right shift can always be accomplished by right-shifting Cm.

The mantissa Cm is provided to a negation circuit 708 that conditionally negates Cm (e.g., using 1's complement negation) if there is a relative minus sign between C and the product A*B. The relative minus sign is detected in sign path 520 as described below, and the sign control signal SignCTL indicates whether a relative minus sign is present. The output of negation circuit 708 (either Cm or ~Cm) is provided to shift circuit 706.

In one embodiment, shift circuit 706 is a 217-bit barrel shifter that can right shift the 54-bit mantissa Cm by up to 157 bits; the Sh_C signal determines the amount by which Cm is right shifted. Mantissa Cm advantageously enters the shifter with an alignment such that Cm can be right-shifted as far as needed. The 217-bit size is chosen to allow enough space for the 53-bit mantissa Cm (plus a guard bit and a round bit) to be aligned entirely to the left or entirely to the right of the 106-bit product A*B (plus a guard bit and a round bit for the product), which will be aligned 55 bits to the right of the MSB of the 217-bit field. Any bits right-shifted out of the barrel shifter can be discarded. In other embodiments, a flag bit is used to keep track of whether all bits right-shifted out of the barrel shifter are "1", and this information can be used in rounding operations described below.

In an alternative embodiment, conventional swap muxes can be used to select the larger operand between product Am*Bm and Cm, then right-shift the smaller operand.

For D2D operations, mantissa Cm is also provided to a D2D logic circuit 710. D2D logic circuit 710 receives mantissa Cm, exponent Ce, and sign Cs and applies integer-rounding rules. In one embodiment, D2D logic circuit 710 determines the location of the binary point based on exponent Ce, then applies the selected rounding rule based on an OPCTL signal (not explicitly shown). Conventional logic for implementing rounding modes may be used, and any combination of rounding modes—including but not limited to truncation, ceiling, floor, and nearest modes—may be supported.

Selection mux 712 receives the shifted mantissa C_Shift, the D2D logic circuit output, and the I2D input from U/S extraction circuit 628 (FIG. 6) and selects one of these inputs, based on an OPCTL signal, as an aligned mantissa C_align to be supplied to mantissa path 516. For double-precision arithmetic and comparison operations, operand C_Shift is selected. For format conversions D2D or I2D, the appropriate alternative input is selected.

Underflow logic 713 is configured to detect potential underflows in fp64 and fp32 results. For operations other than D2F operations, underflow logic 713 determines whether the 11-bit fp64 block exponent BLE is zero or close enough to zero that a denormalized result is possible. Based on the block exponent, underflow logic 713 determines a maximum number of bits that the mantissa can be left-shifted before the exponent reaches zero. This number is provided as an 8-bit underflow signal U_f64 to mantissa path 516 (see FIG. 8). For D2F operations, the exponent is treated as an 8-bit fp32 exponent, and underflow logic 713 determines the maximum left shift allowed. This number is provided as an 8-bit underflow signal U_fp32 to mantissa path 516.

Exponent path 518 also includes final exponent computation logic circuit 704. Block exponent BLE is provided to a subtraction circuit 720. Also provided to subtraction circuit 720 is a block shift (BL_Sh) signal from mantissa path 516. As described below, the BL_Sh signal reflects the effect of cancellation of MSBs when the product Am*Bm is added to operand C_align. Subtraction circuit 720 subtracts BL_Sh from BLE to determine a difference EDIF. Underflow/overflow circuit 722 detects underflow or overflow in the subtraction result EDIF. Plus-1 circuit 724 adds 1 to the result EDIF, and based on the underflow/overflow condition, mux 720 selects between the EDIF and EDIF+1 signals as the result exponent Re. The result Re and the underflow/overflow signal (U/O) are provided to output section 522.

C. Mantissa Path

Figure 8:
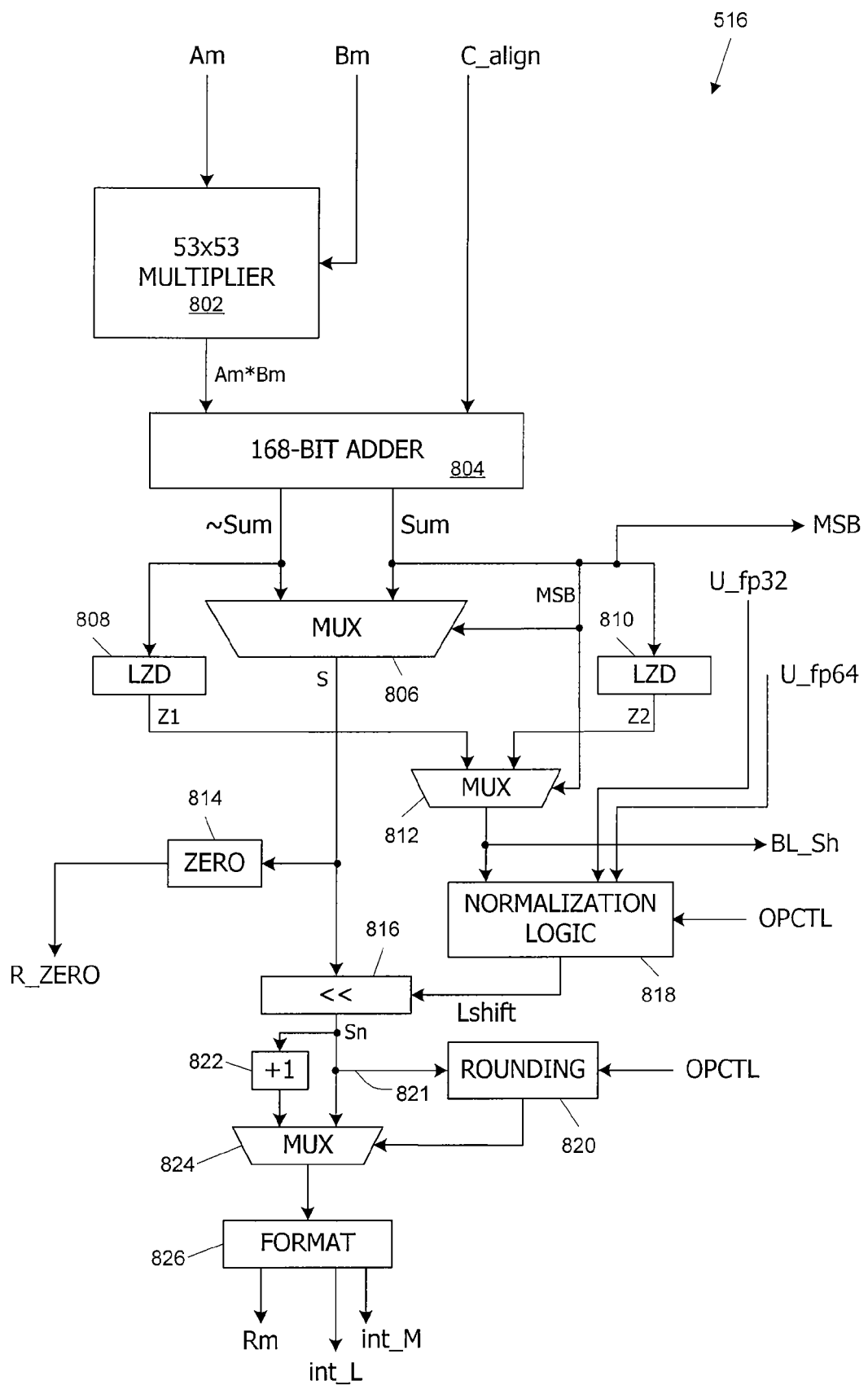
FIG. 8 is a block diagram of a mantissa path for the double-precision functional unit of FIG. 5.

FIG. 8 is a block diagram of mantissa path 516 according to an embodiment of the present invention. Mantissa path 516 performs product and sum operations on mantissas of operands A, B and C.

A 53×53 multiplier 802 receives mantissas Am and Bm from operand preparation block 514 (described above) and computes a 106-bit product Am*Bm. The product is provided to a 168-bit adder 804 that also receives the aligned mantissa C_align. The trailing bits of the 217-bit field used by barrel shifter 706 can be discarded, or flag bits indicating whether the trailing bits were nonzero or all 1s can be preserved. Adder 804 produces Sum and ~Sum (2's complement of the sum) outputs. Mux 806 selects between Sum and ~Sum based on the MSB (sign bit) of the sum. The selected sum (S) is provided to a zero detection circuit 814 and to a left-shift circuit 816. Zero detection circuit 814 determines whether the selected sum S is zero and provides a corresponding R_ZERO signal to sign path 520.

Mantissa path 516 also normalizes the sum S. Leading zero detection (LZD) is performed on both Sum and ~Sum in parallel using LZD circuits 808, 810. Each LZD circuit 808, 810 generates an LZD signal (Z1, Z2) indicating the number of leading zeroes in its input. An LZD mux 812 selects the relevant LZD signal (Z1 or Z2) based on the MSB (sign bit) of the sum. Z2 is selected if Sum is selected by mux 806, and Z1 is selected if ~Sum is selected by mux 806. The selected LZD signal is provided as block shift signal BL_Sh to exponent path 518, where it is used to adjust the result exponent as described above.

Normalization logic 818 selects a left shift amount Lshift that determines a normalization shift for sum S. For normal-number results, the left-shift amount is advantageously large enough to shift the leading 1 out of the mantissa field, leaving a 52-bit significand (plus guard and rounding bits). However, in some instances, the result is an underflow that should be expressed as an fp64 or fp32 denorm. In one embodiment, for operations other than D2F, normalization logic 818 selects the output BL_Sh from LZD mux 812 unless BL_Sh is larger than the underflow signal U_fp64, in which case normalization logic 818 selects U_fp64 as the left-shift amount. For D2F operations, normalization logic 818 uses the fp32 underflow signal U_fp32 to limit the left-shift amount Lshift.

Left-shift circuit 816 left-shifts the sum S by the amount Lshift. The result Sn is provided to rounding logic 820, to a plus-1 adder 822 and to a mantissa selection mux 824. Rounding logic 820 advantageously implements the four rounding modes (nearest, floor, ceiling, and truncation) defined for IEEE standard arithmetic, with different modes possibly selecting different results. The OPCTL signal or another control signal (not shown) may be used to specify one of the rounding modes. Based on the rounding mode and the normalized sum Sn, rounding logic 820 determines whether to select the result Sn or Sn+1 as computed by plus-1 adder 822. Selection mux 824 responds to a control signal from rounding logic 820 by selecting the appropriate result (Sn or Sn+1).

The result selected by mux 824 is passed to a formatting block 826. For operations having a floating-point output, block 826 provides mantissa Rm to output section 522. The sum S is advantageously at least 64 bits wide (to support integer operations), and the extraneous bits may also be removed by formatting block 826. For D2I operations (which have integer outputs), formatting block 826 separates the result into a 52-bit int_L_field that contains the LSBs and an 11-bit int_M field that contains the MSBs. Rm, int_L and int_M are delivered to output section 522.

D. Sign Path

Figure 9:
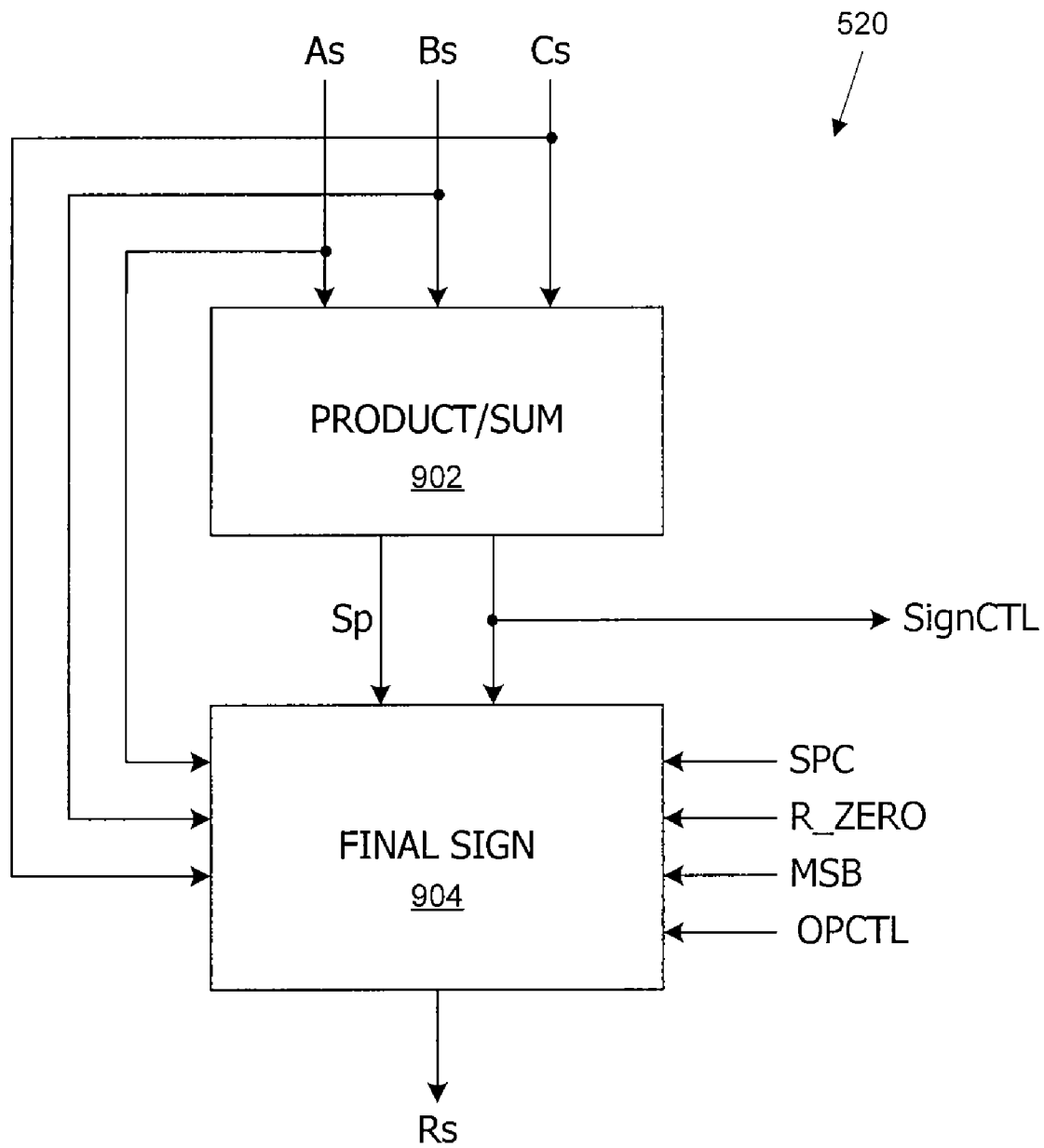
FIG. 9 is a block diagram of a sign path for the double-precision functional unit of FIG. 5.

FIG. 9 is a block diagram of sign path 520 according to an embodiment of the present invention. Sign path 520 receives the signs of the operands As, Bs, and Cs from operand preparation block 514 (FIG. 5). Sign path 520 also receives the zero result signal R_Zero from mantissa path 516 and an OPCTL signal indicating the type of operation in progress, as well as the special number signals SPC from operand preparation block 514. Based on this information, sign path 520 determines the sign of the result and generates a sign bit Rs.

More specifically, sign path 520 includes a product/sum circuit 902 and a final sign circuit 904. Product/sum circuit 902 receives the sign bits As, Bs and Cs of operands A, B and C from operand preparation block 514. Product/sum circuit 902 determines the sign (Sp) of the product A*B using sign bits As and Bs and conventional sign logic rules, then compares the sign of the product to the sign bit Cs to determine whether the product and operand C have the same sign or opposite signs. Based on this determination, product/sum circuit 904 asserts or deasserts the SignCTL signal, which is delivered to final sign circuit 904 and to negation block 708 in exponent path 518 (FIG. 7). Further, if the product and operand C have the same sign, the final result will also have that sign; if the product and operand C have opposite signs, then the result will depend on which is larger.

Final sign circuit 904 receives all information needed to determine the final sign. Specifically, final sign circuit 904 receives sign information, including the sign Sp of the product and the SignCTL signal from product/sum circuit 902, as well as the sign bits As, Bs and Cs. Final sign circuit 904 also receives the zero detection signal R_ZERO from mantissa path 516 and the special number signal SPC from operand preparation block 514. Final sign circuit 904 also receives the MSB of the sum from adder 804 on mantissa path 516, which indicates whether the sum was positive or negative.

Based on this information, final sign circuit 904 can employ conventional sign logic to determine a sign bit Rs for the result. For instance, for DFMA operations, if the sign bits Sp and Cs are the same, the result will also have that sign. If Sp and Cs are opposite signs, then adder 804 in mantissa path 516 computes (Am*Bm)−C_align. If Am*Bm is larger than C_align, then adder 804 will compute a positive result Sum and the product sign Sp should be chosen; if Am*Bm is smaller than C_align, then adder 804 will compute a negative result Sum, and the sign Cs should be chosen. The MSB of the Sum output of adder 804 indicates the sign of the result and can be used to drive the selection. If the result Sum is zero, the R_ZERO signal is asserted, and final sign circuit 904 may choose either sign as appropriate (zero can be either positive or negative in fp64 format). For other operations, final sign circuit 904 may pass through the sign of one or another operand as the final sign.

E. Output Section

Figure 10:
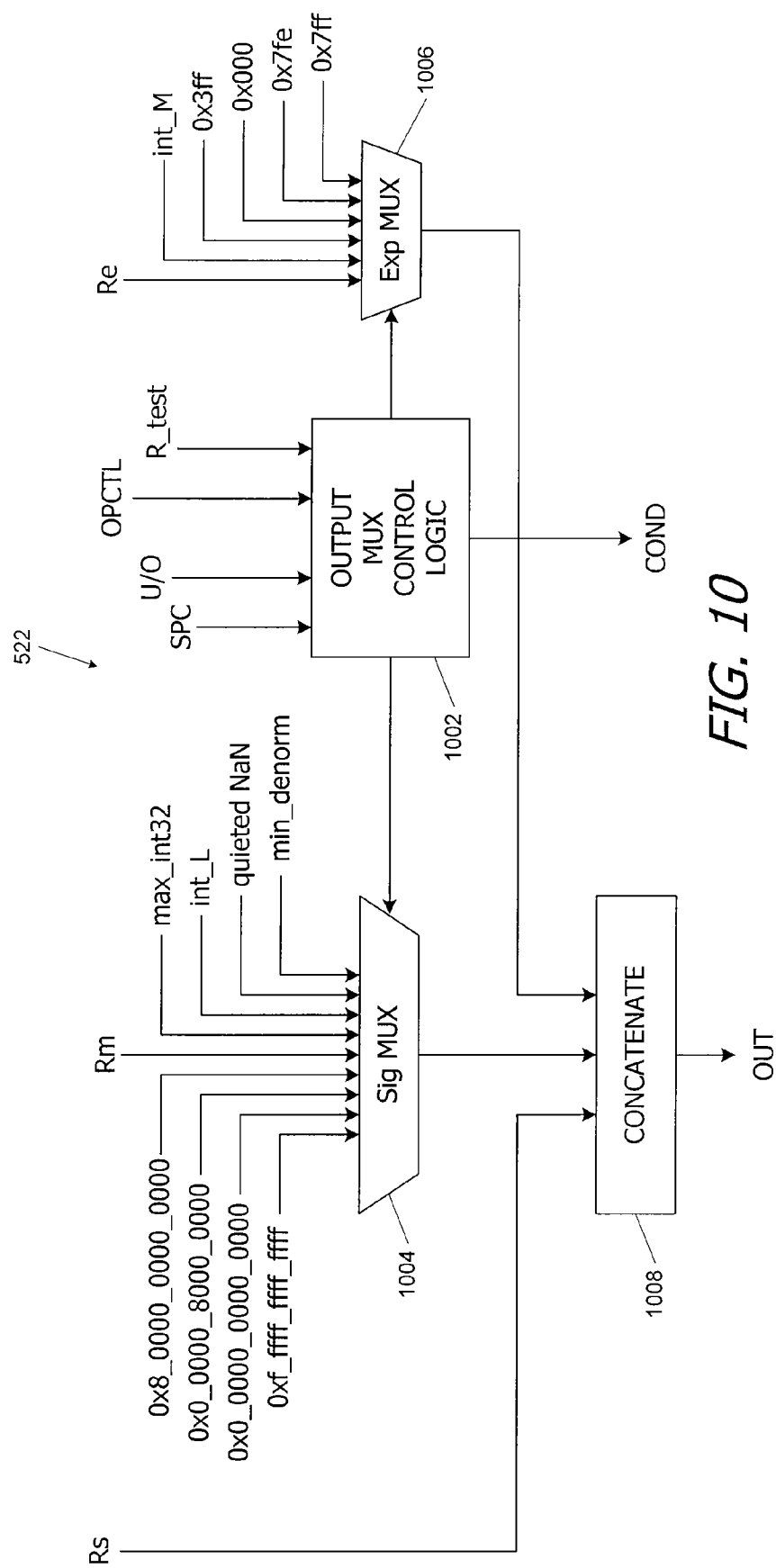
FIG. 10 is a block diagram of an output section for the double-precision functional unit of FIG. 5.

FIG. 10 is a block diagram of output section 522 for DFMA unit 320 according to an embodiment of the present invention.

Output mux control logic 1002 receives the underflow/overflow (U/O) signal from exponent path 518 (FIG. 7), the R_test and SPC signals from operand preparation block 514 (FIG. 6), and an OPCTL signal indicating the type of operation in progress. Based on this information, output mux control logic 1002 generates selection control signals for a significand selection mux 1004 and an exponent selection mux 1006. Output mux control logic 1002 also generates condition code signals COND which may indicate, e.g., overflow or underflow, NaN or other conditions. In some embodiments, the condition code is also used to signal the Boolean result during DSET operations.

Significand selection mux 1004 receives the result significand Rm from mantissa path 516 and up to 52 bits of an integer output (used during D2I operations), as well as a number of special values. The special values in one embodiment include: a 52-bit field of ones (used to express the maximum 64-bit integer for D2I operations); a 52-bit field of zeros (used where 0.0 or 1.0 is the result); a 52-bit field 0x0000_8000_0000 (used to express the minimum 32-bit integer for D2I operations); a 52-bit field with leading 1 (used to represent an internally generated quiet NaN); a max_int32 value, e.g., 0x7fff_ffff_ffff_ffff (used to express the maximum 32-bit integer for D2I operations); a quieted NaN value (used to pass through an input operand that is NaN from operand preparation block 514); and a min denorm value, e.g., 1 in the last bit position (used for underflows). Depending on the operation and whether any of the operands or the result is a special number, any of the inputs may be selected.

Exponent selection mux 1006 receives the result exponent Re from exponent path 518 and up to 11 integer bits (the MSBs for integer-format outputs), as well as a number of special values. The special values in one embodiment include: 0x3ff (the exponent for 1.0 in fp64); 0x000 (the exponent for denorms and 0.0), 0x7fe (the maximum fp64 exponent for normal numbers) and 0x7ff (for fp64 NaN or INF results). Depending on the operation and whether any of the operands or the result is a special number, any of the inputs may be selected.

Concatenation block 1008 receives the sign bit Rs, the significand bits selected by mux 1004 and the exponent bits selected by mux 1006. Concatenation block 1008 formats the result (e.g., in sign, exponent, significand order as per the IEEE 754 standard) and provides the 64-bit output signal OUT.

F. Operand Bypass or Pass-through Paths

DFMA unit 320 in some embodiments provides bypass or passthrough paths allowing operands to propagate unmodified through various circuit blocks. For example, during some operations, multiplier 802 multiplies an input (e.g., Am) by 1.0, effectively passing through the input Am. Rather than multiplying Am by 1.0, a bypass path for input Am around multiplier 802 could be provided. The bypass path advantageously consumes the same number of clock cycles as multiplier 802, so that Am arrives at the input to adder 804 at the correct time. But multiplier 802 can be set into an inactive or low-power state when it is being bypassed, thereby reducing power consumption in exchange for a small increase in circuit area. Likewise, during some operations, adder 804 is used to add zero to an input (e.g., C_align), effectively passing through the input C_align. Rather than adding zero to C_align, a bypass path for input C_align around adder 804 could be provided, particularly for operations where it is known in advance which of the Sum and ~Sum outputs of adder 804 should be selected by mux 806; input C_align can be bypassed onto the correct one of the Sum and ~Sum paths. Again, the bypass path advantageously consumes the same number of clock cycles as adder 804 so that timing is unaffected, but power consumption can be reduced because adder 804 can be placed into an inactive or low-power state for operations that bypass it.

Thus, operational descriptions in Section III (below) may refer to various operands being bypassed or passed through to a particular circuit block; it is to be understood that this can be accomplished either by controlling any intervening circuit blocks to perform an operation that does not affect the operand (e.g., adding zero or multiplying by 1.0) so that the input to the block is passed through as the output or by using a bypass path. Further, following a bypass or pass-through path around some circuit blocks does not necessarily require continuing to follow the bypass path at subsequent circuit blocks. In addition, a value that is modified in one circuit block may follow a bypass pass around a subsequent circuit block. Where a particular circuit block is bypassed during an operation, that circuit block may be set into an inactive state to reduce power consumption or allowed to operate normally with its output being ignored, e.g., through the use of selection muxes or other circuit elements.

It will be appreciated that the DFMA unit described herein is illustrative and that variations and modifications are possible. Many of the circuit blocks described herein provide conventional functions and may be implemented using techniques known in the art; accordingly, detailed descriptions of these blocks have been omitted. The division of operational circuitry into blocks may be modified, and blocks may be combined or varied. In addition, the number of pipeline stages and the assignment of particular circuit blocks or operations to particular pipeline stages may also be modified or varied. The selection and arrangement of circuit blocks for a particular implementation will depend on the set of operations to be supported, and those skilled in the art will recognize that not all of the blocks described herein are required for every possible combination of operations.

III. DFMA Unit Operations

DFMA unit 320 advantageously leverages the circuit blocks described above to support all of the operations listed in FIG. 4 in an area-efficient manner. Accordingly, the operation of DFMA unit 320 depends in at least some respects on which operation is being executed. The following sections describe the use of DFMA unit 320 to perform each of the operations listed in FIG. 4.

It should be noted that floating-point exceptions (including, e.g., overflow or underflow conditions) are handled within DFMA unit 320 without requiring extra processing cycles. For example, operations where an input operand is NaN or other special number are detected in operand preparation block 514 of FIG. 5, and an appropriate special number output is selected in output section 522. Where a NaN, underflow, overflow or other special number arises in the course of the operation, the condition is detected and an appropriate special number output is selected in output section 522.

A. Fused Multiply-Add (DFMA)

For DFMA operations, DFMA unit 320 receives operands A0, B0 and C0 in fp64 format and an opcode indicating that a DFMA operation is to be performed. NaN circuits 612, 614, 616 determine whether any of the selected operands is NaN. Absolute value/negation circuits 618, 620, 622 negate the sign bit (or not) as appropriate for each operand. Operand selection muxes 632, 634, and 636 select the respective outputs of absolute value/negation circuits 618, 620, 622 and provide those outputs to special number detection circuits 638, 640, 642. Special number detection circuits 638, 640 and 642 determine whether each operand is a special number and generate appropriate special number SPC signals on path 524. Special number detection circuits 638, 640 and 642 provide mantissas Am, Bm and Cm (with a leading 1 appended for normal numbers and leading zero for denorms) to mantissa path 516, exponents Ae, Be and Ce to exponent path 518, and sign bits As, Bs and Cs to sign path 520.

A/B comparison circuit 624, fp32 extraction circuit 626 and U/S integer extraction circuit 628 are not used for DFMA operations, and these circuits may be set to an inactive or low-power state if desired.

In sign path 520, product/sum circuit 902 determines from sign bits As and Bs whether the product A*B is positive or negative and compares the sign of the product Sp to sign bit Cs. If the product and Cs have opposite signs, the SignCTL signal is asserted to indicate opposite signs; if the product and Cs have the same sign, the SignCTL signal is deasserted.

In exponent path 518 (FIG. 7), exponent calculation block 702 receives exponents Ae, Be and Ce. Exponent calculation block 702 adds the exponents Ae and Be to determine a block exponent for the product A*B, then selects the larger of the product block exponent and exponent Ce as the result block exponent BLE. Exponent calculation block 702 also subtracts the smaller of the product block exponent and exponent Ce from the larger of the two and generates a corresponding shift control signal Sh_C. Underflow logic 713 detects whether block exponent BLE corresponds to an underflow or potential underflow and generates the underflow signal U_fp64. (The U_fp32 signal is not used during DFMA operations.)

Negation block 708 receives mantissa Cm from operand preparation block 514 and the SignCTL signal from sign path 520. If the SignCTL signal is asserted, negation block 708 inverts mantissa Cm to account for the relative minus sign and provides inverted Cm to shift circuit 706. Otherwise, negation block 708 provides Cm without modification to shift circuit 706.

Shift circuit 706 right-shifts the mantissa Cm as provided by negation block 708 by an amount corresponding to shift control signal Sh_C and provides the shifted C_Shift mantissa to selection mux 712. Selection mux 712 selects shifted mantissa C_Shift and provides the shifted mantissa as operand C_align to mantissa path 516.

In mantissa path 516 (FIG. 8), multiplier 802 computes the 106-bit product Am*Bm and provides the product to 168-bit adder 804. Operation of multiplier 802 can occur in parallel with operation of exponent calculation block 702.

Adder 804 receives operand C_align from selection mux 712 of exponent path 518 and adds inputs Am*Bm and C_align to determine Sum and ~Sum. Based on the MSB of Sum, mux 806 selects one of the outputs as the final sum. Sum is selected if it is positive (MSB zero) while ~Sum is selected if Sum is negative (MSB one). LZD circuits 808 and 810 determine the number of leading zeroes in ~Sum and Sum respectively; mux 812 selects one of the LZD outputs as the number of leading zeroes and provides the leading zero signal BL_Sh to exponent path 518 and to normalization logic 818.

The final sum S selected by mux 806 is also provided to zero detection circuit 814. If the final sum is zero, zero detection circuit 814 asserts the R_ZERO signal to sign path 520; otherwise, the R_ZERO signal is not asserted.

Normalization logic 818 selects the leading zero signal as the normalization signal Lshift unless the U_fp64 signal indicates an underflow, in which case, the mantissa is shifted only to the point corresponding to an exponent of 1, so that the result is expressed in non-normalized form. Shift circuit 816 left-shifts the selected sum S in response to the Lshift signal to produce a normalized sum Sn. Plus-1 adder 822 adds 1 to the normalized sum Sn. Rounding logic 820 uses the rounding mode (specified by an OPCTL signal) and the LSBs of the normalized sum Sn (on path 821) to determine whether the normalized sum should be rounded up. If so, then rounding logic 820 controls selection mux 824 to select the output Sn+1 from adder 822; otherwise; selection mux 824 selects the normalized sum Sn. Selection mux 824 provides the selected result Rm to output section 522. In some embodiments, selection mux 824 drops the leading bit (1 for normal numbers) from the result mantissa.

In parallel with the rounding operations, exponent path 518 (FIG. 7) computes the result exponent Re. Specifically, subtraction block 720 receives block exponent BLE from exponent calculation block 702 and block shift signal BL_Sh from mantissa path 516. Subtraction block 720 subtracts its two inputs and provides the result EDIF to underflow/overflow logic 722, plus-1 adder 724, and selection mux 726. Underflow/overflow logic 722 uses the MSBs of the result to determine whether an underflow or overflow has occurred and generates U/O signals reflecting the presence or absence of underflow or overflow. Based on the U/O signals, selection mux 726 selects between the subtraction result EDIF and the output of plus-1 adder 724. The selected value is provided as a result exponent Re to output section 522, together with the U/O signals.

In parallel with the rounding operations, final sign circuit 904 in sign path 520 (FIG. 9) determines the final sign Rs based on the sign determined by product/sum circuit 902, the R_ZERO signal and the MSB of the sum received from mantissa path 516, and the special number SPC signals received from operand preparation block 514.

Output section 522 (FIG. 10) receives the result mantissa Rm from mantissa path 516, the result exponent Re from exponent path 518, and the result sign Rs from sign path 520, as well as the special number SPC signals from operand preparation block 514 and the U/O signals from exponent path 518. Based on the SPC and U/O signals, output mux control logic 1002 generates a control signal for significand mux 1004 and a control signal for exponent mux 1006. Output mux control logic 1002 also generates various condition codes COND, e.g., indicating whether the result is an overflow, underflow or NaN.

Significand mux 1004 selects significand Rm for normal numbers and denorms. For underflows, either zero or the min denorm significand is selected, depending on rounding mode. For overflows (INF), significand 0x0_0000_0000_0000 is selected. Where any input operand is a NaN, the quieted NaN significand is selected. If a NaN was generated during the operation, the internal (quiet) NaN mantissa 0x8_0000_0000 is selected.

Exponent mux 1006 selects result exponent Re for normal numbers. For denorms and underflows, exponent 0x000 is selected. For INF or NaN, maximum exponent 0x7ff is selected.

Concatenation block 1008 receives the selected significand and exponent and the sign Rs and generates the final fp64 result OUT. Condition codes can be set as desired.

It should be noted that DFMA unit 320 completes all DFMA operations in the same number of cycles, regardless of overflows or underflows. DFMA unit 320 also implements the expected default overflow/underflow behavior for floating-point arithmetic according to the IEEE 754 standard: an appropriate result OUT is returned, and a status flag (in the condition code COND) is set to indicate the overflow/underflow condition. In some embodiments, user-defined traps may be implemented to handle these conditions; the condition code COND can be used to determine whether a trap should occur.

B. Multiplication

Multiplication (DMUL) can be implemented identically to the DFMA operation described above, with operand C set to zero; DFMA unit 320 then computes A*B+0.0. In one embodiment, selection mux 636 (FIG. 6) can be used to replace input operand C with the fp64 zero value when the opcode indicates a DMUL operation.

C. Addition

Addition (DADD) can be implemented identically to the DFMA operation described above, with operand B set to 1.0; DFMA unit 320 then computes A*1.0+C. In one embodiment, selection mux 634 (FIG. 6) can be used to replace input operand B with the fp64 1.0 value when the opcode indicates a DADD operation.

D. DMAX and DMIN

For DMAX or DMIN operations, operand preparation block 514 (FIG. 6) receives operands A and B. NaN circuits 612 and 614 determine whether either or both of the selected operands are NaN. Absolute value/negation circuits 618, 620 negate the sign bit (or not) as appropriate.

A/B comparison circuit 624 receives operands A and B from absolute value/negation circuits 618, 620 and performs the comparison, e.g., by subtracting B from A as if the operands were integers. Based on the subtraction, A/B comparison circuit 624 generates COMP signals indicating whether A is greater than, less than, or equal to B. The COMP signals are provided to control logic 630, which generates corresponding R_Test signals and also generates selection signals for selection muxes 632, 634 and 636.

Specifically, for DMAX operations, operand A mux 632 selects operand A if A is greater than B and operand 1.0 if A is less than B, while operand B mux 634 selects operand B if B is greater than A and operand 1.0 if B is less than A. For DMIN operations, operand A mux 632 selects operand A if A is less than B and operand 1.0 if A is greater than B, while operand B mux 634 selects operand B if B is less than A and operand 1.0 if B is greater than A. For both DMAX and DMIN, the special case of A=B can be handled by controlling mux 632 to select operand A while mux 634 selects operand 1.0 or by controlling mux 632 to select operand 1.0 while mux 634 selects operand B. In any case, operand C mux 636 is advantageously operated to select operand 0.0.

Special number detection circuits 638, 640 and 642 determine whether the operands are special numbers and generate appropriate special number SPC signals on path 524. Special number detection circuits 638, 640 and 642 provide mantissas Am, Bm and Cm (with leading 1 appended for normal numbers and leading zero for denorms) to mantissa path 516; exponents Ae, Be and Ce to exponent path 518 and sign bits As, Bs and Cs to sign path 520.

Fp32 extraction circuit 626 and unsigned/signed integer extraction circuit 628 are not used for DMAX or DMIN operations, and these circuits may be set to an inactive or low-power state if desired.

Mantissa path 516, exponent path 518 and sign path 520 operate as described above for DFMA operations. For DMAX operations, mantissa path 516, exponent path 518 and sign path 520 compute max(A,B)*1.0+0.0; for DMIN operations, mantissa path 516, exponent path 518 and sign path 520 compute min(A,B)*1.0+0.0. Thus, for normal numbers, Rm, Re and Rs correspond to the mantissa, exponent and sign of the desired result.

Output section 522 (FIG. 10) handles special numbers. In particular, the results of DMAX and DMIN operations are undefined for NaN operands, and the result may be set to a NaN value. Output mux control logic 1002 uses the special number SPC signals to determine whether the result should be NaN; if so, significand mux 1004 selects the quieted NaN input while exponent mux selects 0x7ff. Otherwise, the results Rm and Re are selected. Condition codes can be set as desired.

In an alternative embodiment, some or all components of mantissa path 16, exponent path 518 and sign path 520 can be bypassed; bypassed components can be put into a low-power state. The bypass path may include various delay circuits (latches, etc.) so that the path occupies the same number of pipeline stages as the longest of mantissa path 516, exponent path 518 and sign path 520. This ensures that all operations in DFMA unit 320 require the same number of cycles to complete, which simplifies the instruction issue logic.

E. DSET

Like DMAX and DMIN, DSET operations use A/B comparison circuit 624 in operand preparation block 514 (FIG. 6). Unlike DMAX and DMIN, DSET does not return one of the input operands but instead returns a Boolean value indicating whether the tested condition is satisfied.

For DSET operations, operand preparation block 514 (FIG. 6) receives operands A and B. NaN circuits 612 and 614 determine whether either or both of the selected operands are NaN. Absolute value/negation circuits 618, 620 negate the sign bit if appropriate.

A/B comparison circuit 624 receives operands A and B from absolute value/negation circuits 618, 620 and performs the comparison, e.g., by subtracting B from A as if the operands were integers and considers their respective sign bits. Based on the subtraction, A/B comparison circuit 624 generates COMP signals indicating whether A is greater than, less than or equal to B. The COMP signals are provided to control logic 630, which generates corresponding R_Test signals and also generates selection signals for A-mux 632, B-mux 634, and C-mux 636. Since the result of a DSET operation is Boolean, in one embodiment, all three of muxes 632, 634 and 636 select the zero operand. In another embodiment, muxes 632 and 634 select operands A and B; special number detection circuits 638 and 640 determine whether the operands are special numbers and generate appropriate special number SPC signals on path 524.

Fp32 extraction circuit 626 and unsigned/signed integer extraction circuit 628 are not used for DSET operations, and these circuits may be set to an inactive or low-power state if desired.

Mantissa path 516, exponent path 518 and sign path 520 operate as described above for DFMA operations or can be partially or entirely bypassed. Any bypassed components can be put into a low-power state. As noted above, the bypass path may include various delay circuits (latches, etc.) so that the path occupies the same number of pipeline stages as the longest of mantissa path 516, exponent path 518 and sign path 520. This ensures that all operations in DFMA unit 320 require the same number of cycles to complete, which simplifies the instruction issue logic.

Output section 522 (FIG. 10) handles special numbers. In particular, under the IEEE 754 standard, A and B are unordered if A or B (or both) is NaN. Output mux control logic 1002 receives the R_Test signals that indicate whether A is greater than, less than, or equal to B; the special number SPC signals indicating whether A or B is NaN; and an OPCTL signal indicating the particular test operation requested. Output mux control logic 1002 uses the R_Test and SPC signals to determine whether the requested test is satisfied. In one embodiment, the result of a DSET operation is provided as a condition code, and the result OUT is ignored; in that case, output mux control logic 1002 sets the condition code COND to indicate the result and may arbitrarily select a significand and exponent for the output OUT. In another embodiment, the output OUT may be set to reflect the test result, in which case output mux control logic 1002 operates significand mux 1004 and exponent mux 1006 to select a 64-bit value corresponding to logical TRUE if the test is satisfied or a 64-bit value corresponding to logical FALSE if the test is not satisfied.

F. Format Conversions

In some embodiments, DFMA unit 320 also supports format conversion operations to and from double-precision formats. Examples will now be described.

1. fp32 to fp64 (F2D)

For F2D operations, an fp32 input operand A is converted to a corresponding fp64 number. Special number inputs are handled appropriately; e.g., fp32 INF or NaN is converted to fp64 INF or NaN. All fp32 denorms can be converted to fp64 normal numbers.

Operand preparation block 514 (FIG. 6) receives fp32 operand A. Absolute value/negation circuit 618 passes through operand A without modification to fp32 extraction block 626. Fp32 extraction block 626 performs the initial up-conversion of operand A to fp64 format. Specifically, fp32 extraction block 626 extracts the 8-bit exponent and adds 1023−127=896 to produce an 11-bit exponent with the correct bias for fp64 format. The 23-bit mantissa is padded with trailing zeroes. Fp32 extraction block 626 also determines whether operand A is an fp32 special number (e.g., INF, NaN, zero or denorm) and provides that information to special number detection circuit 642 via path 644. Fp32 extraction block 626 can also negate or apply absolute value to the operand.

Operand C mux 636 selects the up-converted operand provided by fp32 extraction block 626; operand A mux 632 and operand B mux 634 select the zero operands. Special number detection circuit 642 prepends a leading 1 to the mantissa unless the operand is an fp32 denorm. Special number detection circuit 642 also uses the special number information provided by fp32 extraction block 626 as its special number SPC signals, except that fp32 denorms are identified as normal numbers (since all fp32 denorms can be expressed as normal numbers in fp64).

Mantissa path 516 and exponent path 518 are operated as described above for DFMA operations to compute 0.0*0.0+C in fp64 format. The normalization elements in mantissa path 516 and exponent path 518 normalize the up-converted fp64 operand. In an alternative embodiment, referring to FIG. 8, the aligned mantissa C_align from exponent path 518 can be bypassed around adder 804 in mantissa path 516 to the Sum input of mux 806; multiplier 802 and adder 804 can be placed into a low-power state. Sign path 520 advantageously passes through the sign bit Cs.

In output section 522 (FIG. 10), the normalized fp64 result (Rm, Rs, Re) is selected unless special number SPC signals indicate that the input operand was fp32 INF, NaN or zero. If the input operand was fp32 INF, output mux control logic 1002 operates significand mux 1004 to select the fp64 INF significand (0x0_0000_0000_0000) and exponent mux 1006 to select the fp64 INF exponent (0x7ff). If the input operand was fp32 NaN, output mux control logic 1002 operates significand mux 1004 to select the fp64 quieted NaN significand and exponent mux 1006 to select the fp64 NaN exponent (0x7ff). If the input operand was fp32 zero, output mux control logic 1002 operates significand mux 1004 to select the fp64 zero significand (0x0000_0000_0000) and exponent mux 1006 to select the fp64 zero exponent (0x000). Condition codes can be set as desired.

2. Integer to fp64 (I2D)

For I2D operations, an integer (u64, s64, u32 or s32 format) is converted to fp64 format. Operand preparation block 514 (FIG. 6) receives the 64-bit integer operand C. For 32-bit integer formats, 32 leading zeroes can be prepended. Absolute value/negation circuit 622 passes through operand C without modification to U/S extraction block 628. U/S extraction block 628 performs the initial up-conversion of operand C to fp64 format. Specifically, extraction block 628 determines the position of the leading 1 in operand C (e.g., using a priority encoder). An 11-bit exponent is determined by initializing an exponent field to 1086 (corresponding to $2^{63}$). For 32-bit input formats, the leading 1 is dropped, and the mantissa is padded with trailing zeroes to generate a 52-bit significand. For 64-bit input formats, the mantissa is truncated if needed to 53 bits and the leading 1 is dropped. A guard bit and round bit may be kept if desired.

U/S extraction block 628 also determines whether the input operand is zero and generates a corresponding control signal for special number detection circuit 642. Other special numbers (denorms, INF and NaN) do not occur during I2D operations and need not be detected.

Operand C mux 636 selects the up-converted operand provided by U/S extraction block 628; operand A mux 632 and operand B mux 634 each select the zero operand. Special number detection circuit 642 uses the zero information provided by U/S extraction block 628 to generate a special number SPC signal indicating whether the input operand is zero.

Mantissa path 516 and exponent path 518 are operated as described above for DFMA operations to compute 0.0*0.0+ C. The normalization elements in mantissa path 516 and exponent path 518 normalize the up-converted fp64 operand. In an alternative embodiment, the aligned mantissa C_align from exponent path 518 can be bypassed around adder 804 in mantissa path 516 to the Sum input of mux 806; multiplier 802 and adder 804 can be placed into a low-power state. Sign path 520 advantageously passes through the sign bit Cs.

In output section 522 (FIG. 10), the normalized fp64 result (Rm, Rs, Re) is selected unless special number SPC signals indicate that the input operand was integer zero. If the input operand was integer zero, output mux control logic 1002 operates significand mux 1004 to select the fp64 zero significand (0x0000_0000_0000) and exponent mux 1006 to select the fp64 zero exponent (0x000). Condition codes can be set as desired.

3. fp64 to fp32 (D2F)

Since fp64 covers a larger range of floating-point values than fp32, converting from fp64 to fp32 (D2F) requires detection of overflows and underflows in the fp32 value.

For D2F operations, the operand C is provided to operand preparation block 514 (FIG. 6). Absolute value/negation circuit 622 performs absolute value or operand negation as desired and passes operand C to operand C mux 636, which selects operand C to be provided to special number detection circuit 642. Special number detection circuit 642 detects fp64 denorm, zero, INF or NaN and provides corresponding SPC signals to output section 522. Selection muxes 632 and 634 select the 0.0 operands.

In exponent path 518 (FIG. 7), exponent calculation block 702 biases the fp64 exponent down by 897 to determine a corresponding fp32 exponent. If the fp32 exponent underflows, exponent calculation block 702 generates a Sh_C signal that will right-shift the mantissa of C to eliminate the underflow (if a shift of more than 217 bits is needed, the mantissa of C will become zero). Shift circuit 706 right-shifts the mantissa of C in accordance with the Sh_C signal. The result is selected by mux 712 and provided as aligned mantissa C_align to mantissa path 516. Underflow logic 713 detects an fp32 underflow and generates the U_fp32 signal.

In mantissa path 516 (FIG. 8), multiplier 802 computes the product 0.0*0.0 (or is bypassed). The product (zero) is added to mantissa C_align by adder 804. The Sum result is selected by mux 806 (since the input is in sign/magnitude form). A zero result is detected by circuit 814; non-zero results are normalized as described above in the context of DFMA operations. Rounding logic 820 can be used to determine whether to round up; it should be noted that plus-1 adder 822 would need to add 1 to the 24th bit position (rather than the 53rd) as the result is to be a 23-bit fp32 mantissa.

Output section 522 (FIG. 10) assembles the result. The 23-bit fp32 significand is provided in 52-bit field Rm. Output mux control logic 1002 controls significand mux 1004 to select Rm unless the result is not an fp32 normal number. For fp32 zero or INF, the zero mantissa 0x0000_0000_0000 is selected; for fp32 NaN, a quieted fp32 NaN mantissa is selected. For fp32 denorms, Rm can be used.

The 8-bit fp32 exponent is provided in an 11-bit exponent field. Output mux control logic 1002 controls exponent mux 1004 to select Re unless the result is not an fp32 normal number. For fp32 denorms or zero, the zero exponent 0x000 is selected. For fp32 INF or NaN, the maximum fp32 exponent 0x7ff is selected.

Concatenation block 1008 packs Rm and Re into 31 bits of the 64-bit output field and appends the sign bit Rs. The 3 MSBs in the 11 bit exponent are dropped, as are the 29 LSBs in the 52-bit significand. The fp32 result may be aligned, e.g., in the MSBs or LSBs of the 64-bit field as desired. Condition codes may be set as desired.

4. fp64 to integer (D2I)

For D2I operations, overflows and underflows are detected. Overflows are set to the maximum integer value, and underflows are set to zero.

The operand to be converted is provided as operand C in fp64 format. Absolute value/negation circuit 622 performs absolute value or operand negation as desired and passes operand C to operand C mux 636, which selects operand C to be provided to special number detection circuit 642. Special number detection circuit 642 detects fp64 denorm, zero, INF or NaN and provides corresponding SPC signals to output section 522. Selection muxes 632 and 634 select the 0.0 operands.

In exponent path 518 (FIG. 7), exponent calculation block 702 uses the exponent Ce to determine the amount by which Cm should be shifted to align the binary point at the integer position and generates a corresponding Sh_C signal. In one embodiment, exponent calculation block 702 removes the exponent bias and accounts for the width of the significand, the integer format to be used, and how results for 32-bit formats are to be represented in a 64-bit field (e.g., using the 32 MSBs or 32 LSBs). The exponent Ce is also used to determine whether the result will overflow or underflow in the target integer format; if so, a corresponding overflow or underflow signal (not explicitly shown) is advantageously sent to output mux control logic 1002 in output section 522 (FIG. 10).

Shift circuit 706 shifts Cm by the amount C_Shift, and the C_Shift signal is selected as the C_align signal by mux 712.

In mantissa path 516 (FIG. 8), multiplier 802 provides a 0.0 result to adder 804. Adder 804 adds 0.0 to C_align and selects Sum or ~Sum depending on whether C is positive or negative. Shifter 816 advantageously does not shift the result. Integer format block 826 separates the result into an 11-bit MSB field int_M and a 53-bit LSB field int_L.

In output section 522 (FIG. 10), output mux control logic 1002 controls significand mux 1004 and exponent mux 1006 to select the int_L and int_M results, respectively, except in the case of an overflow, underflow or special-number operand. For overflows, the maximum integer in the output format (u32, s32, u64 or s64) is selected; for underflows, zero is selected. Condition codes may be set as desired.

IV. Further Embodiments

While the invention has been described with respect to specific embodiments, one skilled in the art will recognize that numerous modifications are possible. For instance, a DFMA unit may be implemented to support more, fewer, or different functions in combination and to support operands and results in any format or combinations of formats.

The various bypass paths and pass-throughs described herein may also be varied. In general, where a bypass path around any circuit block is described, that path may be replaced by an identity operation (i.e., an operation with no effect on its operand, such as adding zero) in that block. A circuit block is bypassed during a given operation may be placed into an idle state (e.g., a reduced power state) or operated normally with its result being ignored by downstream blocks, e.g., through operation of selection muxes or other circuits.

The DFMA pipeline can be divided into any number of stages, and the combination of components at each stage may be varied as desired. Functionality ascribed to particular circuit blocks herein may also be separated across pipeline stages; for instance, a multiplier tree might occupy multiple stages. The functionality of various blocks may also be modified. In some embodiments, for example, different adder circuits or multiplier circuits may be used.

In addition, the DFMA unit has been described in terms of circuit blocks to facilitate understanding; those skilled in the art will recognize that the blocks may be implemented using a variety of circuit components and layouts and that blocks described herein are not limited to a particular set of components or physical layout. Blocks may be physically combined or separated as desired.

A processor may include one or more DFMA units in an execution core. For example, where superscalar instruction issue (i.e., issuing more than one instruction per cycle) or SIMD instruction issue is desired, multiple DFMA units may be implemented, and different DFMA units may support different combinations of functions. A processor may also include multiple execution cores, and each core may have its own DFMA unit(s).

In some embodiments where the execution core supports SIMD instruction issue, a single DFMA unit may be used in combination with appropriate input sequencing and output collection logic to allow multiple data sets to be processed sequentially in a single DFMA pipeline.

Figure 11:
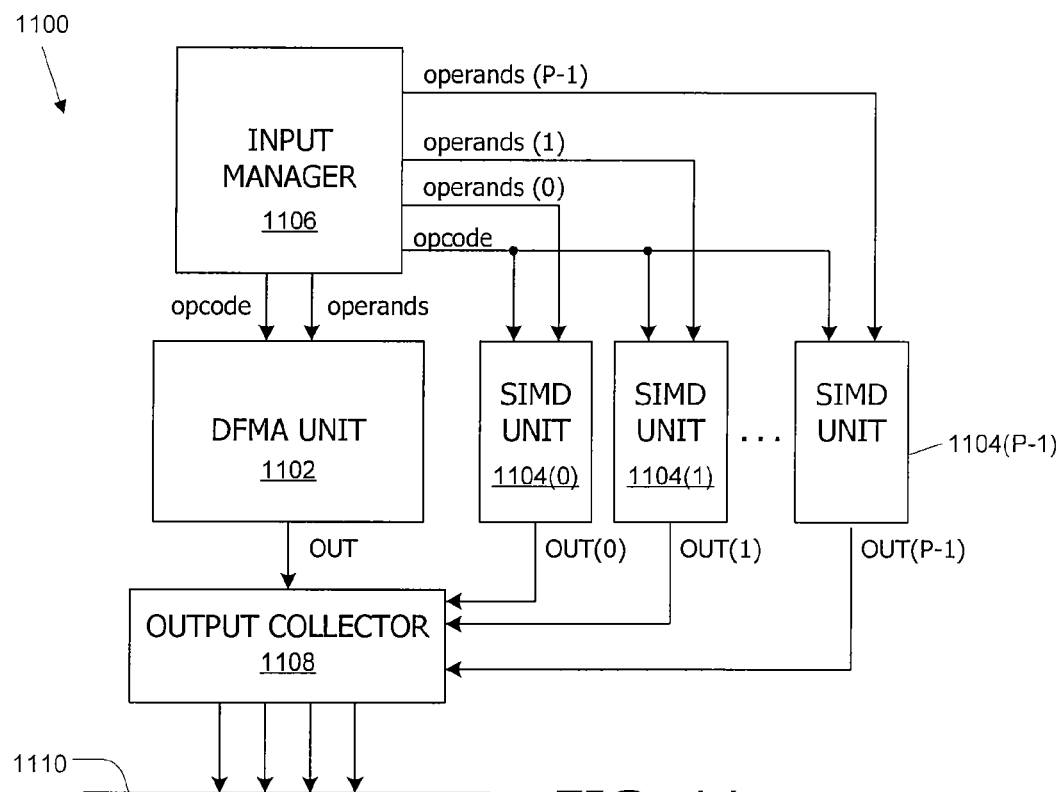
FIG. 11 is a block diagram of an execution core according to an embodiment of the present invention.

FIG. 11 is a block diagram of an execution core 1100 including a DFMA functional unit 1102 according to an embodiment of the present invention. DFMA unit 1102 can be similar or identical to DFMA unit 320 described above. Core 1100 issues SIMD instructions, meaning that the same instruction with P different sets of single-precision operands can be issued in parallel to a set of P single-precision SIMD units 1104. Each SIMD unit 1104 receives the same opcode and a different set of operands; the P SIMD units 1104 operate in parallel to generate P results. P-way SIMD instructions are issued to DFMA unit 1102 as a series of P single-instruction, single data (SISD) instructions.

An input manager 1106 (which can be part of an instruction issue unit) collects operands for SIMD instructions and, when all P sets of operands for the SIMD instruction have been collected, delivers the operands and the applicable opcode to either the P SIMD units 1104 or to DFMA unit 1102. An output collector 1008 collects the results from SIMD units 1104 or DFMA unit 1102 and delivers the results via results bus 1110 to a register file (not explicitly shown in FIG. 11). In some embodiments, results bus 1110 also provides a bypass path to input manager 1106 so that results can be delivered to input manager 1106 for use with a subsequent instruction in parallel with delivery to the register file. To provide the appearance of SIMD behavior using one DFMA unit 1102, input manager 1106 can advantageously serialize issue of instructions to DFMA unit 1102, e.g., by issuing the same opcode with a different set of operands on each of P consecutive clock cycles.

Figure 12:
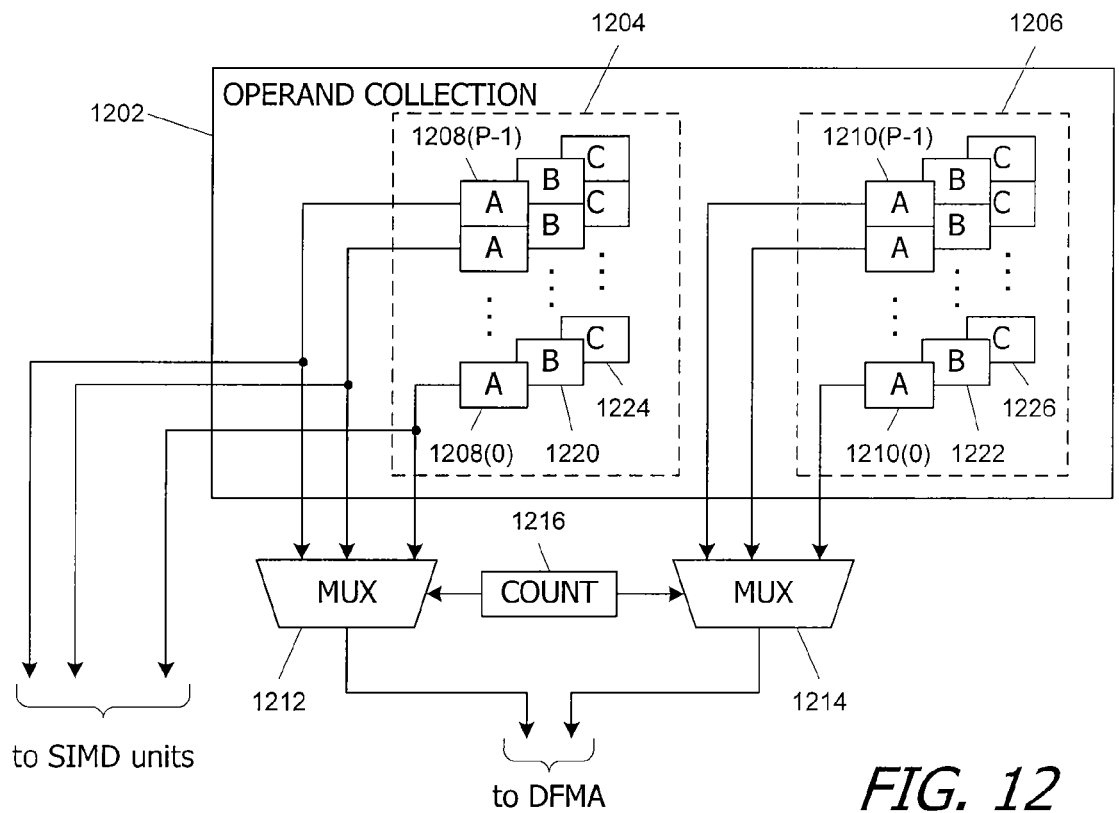
FIG. 12 is a block diagram showing operand sequencing for a double-precision functional unit according to an embodiment of the present invention.

FIG. 12 is a block diagram showing serialized instruction issue for DFMA unit 1102 according to an embodiment of the present invention. An input operand collection unit 1202, which may be included in input manager 1106 of FIG. 11, includes two collectors 1204, 1206. Each collector 1204, 1206 is an arrangement of 32-bit registers that provides sufficient space for P triplets of single-precision operands A, B, and C; in other words, each collector 1204, 1206 can store all operands for a single SIMD instruction. Input operand collection unit 1202 obtains operands, e.g., from register file 324 of FIG. 3 and/or from results bus 1110 of FIG. 11; tags or other conventional techniques may be used to determine which operands are to be collected for a given instruction. Enough collectors 1206 are provided to allow operands for a given instruction to be collected several clock cycles in advance of when that instruction is to be issued.

For single-precision instructions, one collector (e.g., collector 1204) is loaded with all of the operands needed for the P SIMD units 1104 to execute one instruction. When the instruction is issued to the P SIMD units 1104, the entire collector 1204 is advantageously read in parallel, with a different A, B, C operand triplet being delivered to each one of the SIMD units 1104.

For instructions to DFMA unit 1102, the operands are double-precision (e.g., 64 bits). Each operand may be stored using corresponding registers in both collectors 1204, 1206; for instance, register 1208 in collector 1204 may store the 32 MSBs (e.g., sign bit, 11 exponent bits and the 20 MSBs of the significand) of one instance of operand A while register 1210 in collector 1206 stores the 32 LSBs (e.g., the remaining 32 bits of the significand) of the same operand. All of the operand triplets A, B, C needed for a P-way double-precision SIMD instruction can thus be collected using two single-precision collectors 1204, 1206.

Core 1100 has only one DFMA unit 1102, and the P operand sets are advantageously delivered sequentially using output multiplexers (muxes) 1212, 1214, both of which are controlled by a counter 1216. Muxes 1212 and 1214 select the MSBs and LSBs of an operand triplet from respective collectors 1204 and 1206 in response to the counter 1216. For example, in the data paths shown, mux 1212 can select the 32 MSBs of operand A from register 1208 in collector 1204 while mux 1214 selects the 32 LSBs of the same operand A from register 1210 in collector 1206. The 64 bits are delivered on a double-precision-wide path to DFMA unit 1102. Similarly, the operands B (from registers 1220 and 1222) and C (from registers 1224 and 1226) can be delivered to DFMA unit 1102 using corresponding muxes (not explicitly shown) controlled by the same counter 1216. On the next clock cycle, operands A, B, and C from the next set of registers in collectors 1204 and 1206 can be delivered to DFMA unit 1102, and so on until all P sets of operands have been delivered.

Muxes 1212 and 1214, together with collectors 1204 and 1206, provide the external appearance of SIMD execution for DFMA unit 1102, albeit with reduced throughput. Thus, a programming model for core 1100 can assume that P-way SIMD execution is available for all instructions, including double-precision instructions.

It will be appreciated that the operand collection and sequencing logic described herein is illustrative and that variations and modifications are possible. In a SIMD-capable core, any number of DFMA units may be provided and instructions may be issued to any number of the DFMA units in parallel. In some embodiments, throughput for double-precision operations relative to single-precision operations scales with the number of DFMA units. For example, if there are P SIMD units and N DFMA units, double-precision throughput will be N/P of the single-precision throughput. In some embodiments, N is optimally equal to P; in other embodiments, other factors—e.g., the width of internal data paths between the register file and the functional units—may limit the double-precision throughput to less than the single-precision throughput regardless of the number of DFMA units present. In that case, N is optimally no larger than the other limiting factors allow.

It should also be noted that since the DFMA unit is separate from single-precision functional units, it can be powered down when not in use, e.g., when the graphics processor or core is being used exclusively for rendering processes or other computations that do not require double-precision. Further, the DFMA unit can be removed from the integrated circuit design without affecting the operation of other circuit components. This facilitates the design of product families in which different chips provide different levels of support for double-precision operations. For instance, a GPU family might include a high-end GPU with many cores, each of which includes at least one DFMA unit, and a low-end GPU with no hardware-based double-precision support and no DFMA units.

Further, while the invention has been described with reference to a graphics processor, those skilled in the art will appreciate that aspects of the present invention may also be employed in other processors such as math co-processors, vector processors, or general-purpose processors.

Thus, although the invention has been described with respect to specific embodiments, it will be appreciated that the invention is intended to cover all modifications and equivalents within the scope of the following claims.

What is claimed is:

1. A graphics processor comprising:
a rendering pipeline adapted to generate image data, the rendering pipeline including a processing core adapted to execute a plurality of concurrent threads, wherein the rendering pipeline operates on single-precision operands, the processing core further including a multipurpose double-precision functional unit adapted to selectably execute one of a plurality of double-precision operations on a set of double-precision input operands, the multipurpose double-precision functional unit including at least one arithmetic logic circuit, the plurality of double-precision operations including an addition operation that adds two double-precision operands, a multiplication operation that multiplies two double-precision operands, and a fused multiply-add operation that computes a product of a first double precision operand and a second double-precision operand then adds a third double-precision operand to the product, wherein the multipurpose double-precision functional unit is wide enough to perform each of the plurality of double-precision operations in a single pass, such that each of the plurality of double-precision operations completes in a same number of clock cycles, and wherein all of the arithmetic logic circuits of the double-precision functional unit are sufficiently wide to operate at double-precision.

2. The graphics processor of claim 1 wherein the double-precision functional unit is further adapted such that each of the plurality of double-precision operations completes in a same number of clock cycles regardless of whether an overflow or underflow condition occurs.

3. The graphics processor of claim 2 wherein the double-precision functional unit is further adapted to produce an overflow or underflow result complying with a floating-point arithmetic standard in the event that an overflow or underflow condition does occur and to set an output status flag to indicate whether the overflow or underflow condition occurred.

4. The graphics processor of claim 1 wherein the double-precision functional unit is further adapted such that a time required to complete any one of the plurality of double-precision operations is not affected by a floating-point exception.

5. The graphics processor of claim 1 wherein the plurality of double-precision operations further includes a double-precision comparison (DSET) operation that performs a comparison test on a first operand and a second operand and generates a Boolean result indicating whether the comparison test is satisfied.

6. The graphics processor of claim 1 wherein the plurality of double-precision operations further includes:
  a double-precision maximum (DMAX) operation that returns a larger one of two double-precision input operands; and
  a double-precision minimum (DMIN) operation that returns a smaller one of two double-precision input operands.

7. The graphics processor of claim 1 wherein the plurality of double-precision operations further includes at least one format conversion operation that converts an operand from a double-precision format to a non-double-precision format.

8. The graphics processor of claim 1 wherein the plurality of double-precision operations further includes at least one format conversion operation that converts an operand from a non-double-precision format to a double-precision format.

9. A graphics processor comprising:
  a rendering pipeline adapted to generate image data, the rendering pipeline including a processing core adapted to execute a plurality of concurrent threads,
  the processing core including a single-precision functional unit adapted to execute an arithmetic operation on one or more single-precision operands,
  the processing core further including a double-precision fused multiply-add (DFMA) functional unit adapted to execute a fused multiply-add operation on a set of double-precision input operands and to provide a double-precision result, to execute an addition operation on a pair of double-precision input operands and to provide a double-precision result, and to execute a multiplication operation on a pair of double-precision input operands and to provide a double-precision result,
  wherein the DFMA functional unit includes a DFMA pipeline having data paths wide enough to perform the fused multiply-add operation, the addition operation, or the multiplication operation in a single pass through the DFMA pipeline, such that the fused multiply-add operation, the addition operation, and the multiplication operation are each completed in a same number of clock cycles.

10. The graphics processor of claim 9 wherein the DFMA functional unit includes:
  a multiplier adapted to compute a product of two double-precision mantissas in a single iteration; and
  an adder adapted to compute a sum of two double-precision mantissas in a single iteration.

11. The graphics processor of claim 9 wherein:
  the fused multiply-add operation, the addition operation, and the multiplication operation are each completed in a same number of clock cycles, regardless of whether an overflow or underflow condition occurs.

12. The graphics processor of claim 11 wherein the DFMA functional unit is further configured to produce an overflow or underflow result complying with a floating-point arithmetic standard in the event that an overflow or underflow condition occurs and to set an output status flag to indicate whether the overflow or underflow condition occurred.

13. The graphics processor of claim 9 wherein the processing core includes a number (P) of copies of the single-precision functional unit adapted to operate in parallel and a number (N) of copies of the DFMA functional unit.

14. The graphics processor of claim 13 wherein the number P is larger than the number N.

15. The graphics processor of claim 14 wherein the number N is one.

16. The graphics processor of claim 15 wherein the processing core further includes an input manager circuit adapted to collect N sets of double-precision input operands for the DFMA functional unit and to deliver different ones of the N sets of double-precision operands to the DFMA functional unit on different clock cycles.

17. The graphics processor of claim 16 wherein the input manager circuit is further adapted to collect P sets of single-precision input operands for the single-precision functional unit and to deliver, in parallel, a different one of the P sets of single-precision operands to each one of the P copies of the single-precision functional unit.

* * * * *